United States Patent
Lin et al.

(10) Patent No.: US 9,335,522 B2
(45) Date of Patent: May 10, 2016

(54) PHOTOGRAPHING OPTICAL LENS ASSEMBLY, IMAGE CAPTURING UNIT AND ELECTRONIC DEVICE

(71) Applicant: LARGAN Precision Co., Ltd., Taichung (TW)

(72) Inventors: Cheng-Chen Lin, Taichung (TW); Hsin-Hsuan Huang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 17 days.

(21) Appl. No.: 14/564,471

(22) Filed: Dec. 9, 2014

(65) Prior Publication Data
US 2016/0103299 A1  Apr. 14, 2016

(30) Foreign Application Priority Data
Oct. 8, 2014  (TW) .............. 103135076 A

(51) Int. Cl.
  *G02B 13/00* (2006.01)
  *G02B 13/18* (2006.01)
  *G02B 9/62* (2006.01)
  *H04N 5/225* (2006.01)
(52) U.S. Cl.
  CPC .............. *G02B 13/0045* (2013.01); *G02B 9/62* (2013.01); *G02B 13/18* (2013.01); *H04N 5/225* (2013.01)
(58) Field of Classification Search
  CPC ...... G02B 13/0045; G02B 13/18; G02B 9/60; G02B 9/62; H04N 5/225
  USPC ........................................ 359/713, 756–757
  See application file for complete search history.

(56) References Cited

U.S. PATENT DOCUMENTS

| 5,200,861 A | 4/1993 | Moskovich |
| 5,278,698 A | 1/1994 | Iizuka et al. |
| 8,385,006 B2 | 2/2013 | Tsai et al. |
| 2013/0314804 A1 | 11/2013 | Kubota et al. |

(Continued)

FOREIGN PATENT DOCUMENTS

| JP | 2012220741 A | 11/2012 |
| TW | 201239445 A | 10/2012 |

(Continued)

OTHER PUBLICATIONS

Intellectual Property Office, Ministry of Economic Affairs, R. O. C, "Office Action", Nov. 19, 2015, Taiwan.

*Primary Examiner* — Jordan Schwartz
(74) *Attorney, Agent, or Firm* — Locke Lord LLP; Tim Tingkang Xia, Esq.

(57) ABSTRACT

A photographing optical lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region. The second lens element has refractive power. The third lens element has positive refractive power. The fourth lens element has refractive power. The fifth lens element with positive refractive power has an object-side surface being convex in a paraxial region and an image-side surface being convex in a paraxial region. The sixth lens element with positive refractive power has an object-side surface being convex in a paraxial region and an image-side surface being concave in a paraxial region, and the image-side surface thereof has at least one inflection point.

30 Claims, 17 Drawing Sheets

(56) References Cited

U.S. PATENT DOCUMENTS

| | | |
|---|---|---|
| 2013/0335834 A1 | 12/2013 | Tsai et al. |
| 2014/0063617 A1* | 3/2014 | Chae .................... G02B 13/004 359/713 |
| 2014/0240852 A1* | 8/2014 | Hsu .................... G02B 13/0045 359/713 |
| 2015/0177485 A1 | 6/2015 | Hsu et al. |
| 2015/0268446 A1* | 9/2015 | Chen ........................ G02B 9/62 348/148 |
| 2015/0323765 A1 | 11/2015 | Hashimoto |
| 2015/0346459 A1 | 12/2015 | Chen et al. |
| 2015/0346460 A1 | 12/2015 | Chen et al. |
| 2015/0346461 A1 | 12/2015 | Chen et al. |
| 2016/0004048 A1* | 1/2016 | Noda ........................ G02B 9/62 359/713 |

FOREIGN PATENT DOCUMENTS

| | | |
|---|---|---|
| TW | 201326883 A | 7/2013 |
| TW | 201403120 A | 1/2014 |
| TW | 201418763 A | 5/2014 |
| WO | 2010024214 A1 | 3/2010 |

* cited by examiner

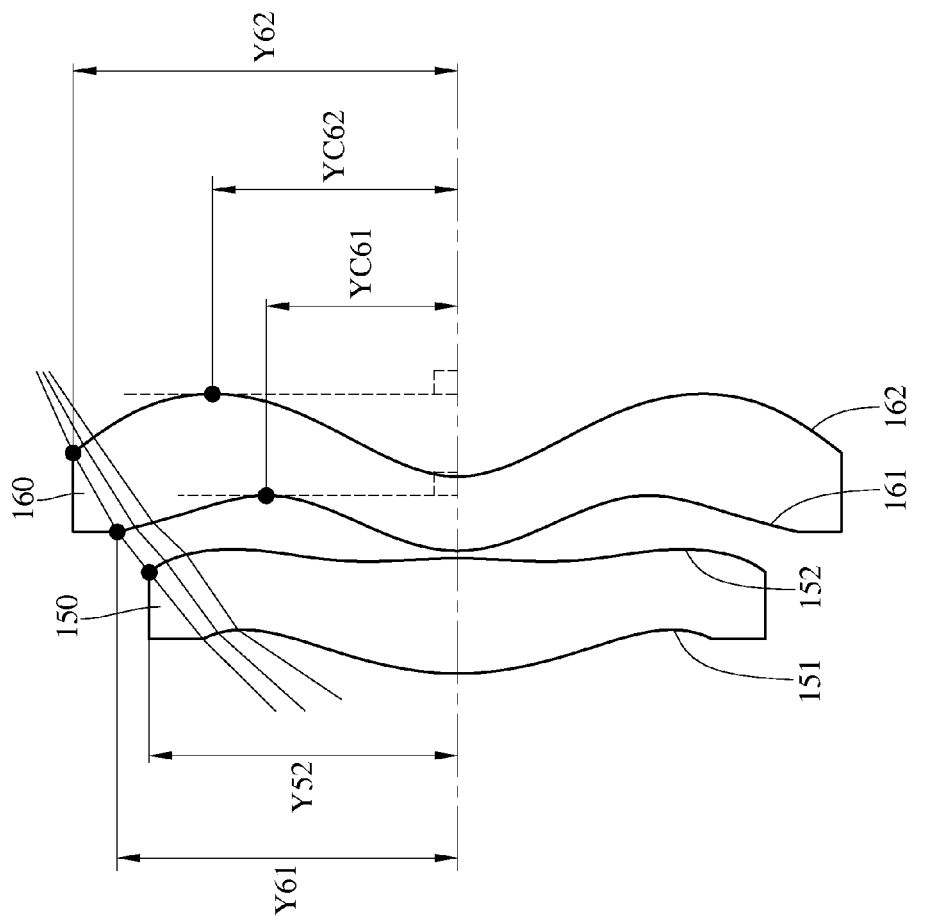

PHOTOGRAPHING OPTICAL LENS ASSEMBLY, IMAGE CAPTURING UNIT AND ELECTRONIC DEVICE

RELATED APPLICATIONS

This application claims priority to Taiwan Application 103135076, filed Oct. 8, 2014, which is incorporated by reference herein in its entirety.

BACKGROUND

1. Technical Field

The present disclosure relates to a photographing optical lens assembly, an image capturing unit and an electronic device, more particularly to a photographing optical lens assembly and an image capturing unit applicable to an electronic device.

2. Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a five-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with six-element lens structure are developed to enhance resolution and image quality. However, the refractive power of the optical system is not evenly distributed; therefore, the refractive power is easily overloaded on a single lens element, thereby resulting in excessive aberration. Furthermore, the lens elements close to an image side with overloaded refractive power and unfavorable surface design problem not only limit the field of view but also result in excessive astigmatism and distortion in an off-axis region, thereby influencing the image quality at the peripheral region of the image.

SUMMARY

According to one aspect of the present disclosure, a photographing optical lens assembly includes, in order from an object side to an image side, a first lens element, a second lens element, a third lens element, a fourth lens element, a fifth lens element, and a sixth lens element. The first lens element with positive refractive power has an object-side surface being convex in a paraxial region thereof. The second lens element has refractive power. The third lens element has positive refractive power. The fourth lens element has refractive power. The fifth lens element with positive refractive power has an object-side surface being convex in a paraxial region thereof and an image-side surface being convex in a paraxial region thereof, wherein both of the object-side surface and the image-side surface of the fifth lens element are aspheric. The sixth lens element with positive refractive power has an object-side surface being convex in a paraxial region thereof and an image-side surface being concave in a paraxial region thereof, wherein both of the object-side surface and the image-side surface of the sixth lens element are aspheric, and the image-side surface of the sixth lens element has at least one inflection point. The photographing optical lens assembly has a total of six lens elements with refractive power. When a central thickness of the fifth lens element is CT5, a central thickness of the sixth lens element is CT6, an axial distance between the object-side surface of the first lens element and an image surface is TL, a maximum image height of the photographing optical lens assembly is ImgH, a focal length of the photographing optical lens assembly is f, a focal length of the first lens element is f1, a focal length of the fifth lens element is f5, and a focal length of the sixth lens element is f6, the following conditions are satisfied:

$CT6/CT5<2.5$;

$TL/ImgH<3.0$;

$0<f1<f6$; and $0<(f5*f6)/[f*(f5+f6)]<1.15$.

According to another aspect of the present disclosure, a photographing optical lens assembly includes, in order from an object side to an image side, a first lens element, a second lens element, a third lens element, a fourth lens element, a fifth lens element, and a sixth lens element. The first lens element with refractive power has an object-side surface being convex in a paraxial region thereof. The second lens element has refractive power. The third lens element has positive refractive power. The fourth lens element has refractive power. The fifth lens element has positive refractive power, wherein both of an object-side surface and an image-side surface of the fifth lens element are aspheric. The sixth lens element with positive refractive power has an object-side surface being convex in a paraxial region thereof and an image-side surface being concave in a paraxial region thereof, wherein both of the object-side surface and the image-side surface of the sixth lens element are aspheric, and the image-side surface of the sixth lens element has at least one inflection point. The photographing optical lens assembly has a total of six lens elements with refractive power. When a central thickness of the fifth lens element is CT5, a central thickness of the sixth lens element is CT6, an axial distance between the object-side surface of the first lens element and an image surface is TL, a maximum image height of the photographing optical lens assembly is ImgH, a curvature radius of an object-side surface of the third lens element is R5, and a curvature radius of an image-side surface of the third lens element is R6, the following conditions are satisfied:

$CT6/CT5<0.90$;

$TL/ImgH<3.0$; and $-0.5<R6/R5$.

According to still another aspect of the present disclosure, a photographing optical lens assembly includes, in order from an object side to an image side, a first lens element, a second lens element, a third lens element, a fourth lens element, a fifth lens element, and a sixth lens element. The first lens element with refractive power has an object-side surface being convex in a paraxial region thereof. The second lens element has refractive power. The third lens element has positive refractive power. The fourth lens element has refractive power. The fifth lens element has positive refractive power, wherein both of an object-side surface and an image-side surface of the fifth lens element are aspheric. The sixth lens element with positive refractive power has an object-side surface being convex in a paraxial region thereof and an image-side surface being concave in a paraxial region thereof, wherein both of the object-side surface and the image-side surface of the sixth lens element are aspheric, and the image-side surface of the sixth lens element has at least one inflection point. The photographing optical lens assembly has a total of six lens elements with refractive power. When a central thickness of the fifth lens element is CT5, a central thickness of the sixth lens element is CT6, an axial distance between the object-side surface of the first lens element and an image surface is TL, a maximum image height of the photographing optical lens assembly is ImgH, a curvature radius of an object-side surface of the third lens element is R5, a curvature radius of an image-side surface of the third lens element is R6, a focal length of the photographing optical lens assembly is f, a focal length of the fifth lens element is f5, a focal length of the sixth lens element is f6, the following conditions are satisfied:

$$CT6/CT5<1.5;$$

$$TL/ImgH<3.0;$$

$$-0.5<R6/R5; \text{ and}$$

$$0<(f5*f6)/[f*(f5+f6)]<1.15.$$

According to yet another aspect of the present disclosure, an image capturing unit includes the photographing optical lens assembly according to the aforementioned aspect and an image sensor, wherein the image sensor is disposed on the image side of the photographing optical lens assembly.

According to still yet another aspect of the present disclosure, an electronic device includes the image capturing unit according to the aforementioned aspect.

BRIEF DESCRIPTION OF THE DRAWINGS

The disclosure can be more fully understood by reading the following detailed description of the embodiments, with reference made to the accompanying drawings as follows:

FIG. 15 is a schematic view of Y52 of a fifth lens element and Y61, Y62, Yc61, Yc62 of a sixth lens element in FIG. 1;

DETAILED DESCRIPTION

Figure 1:
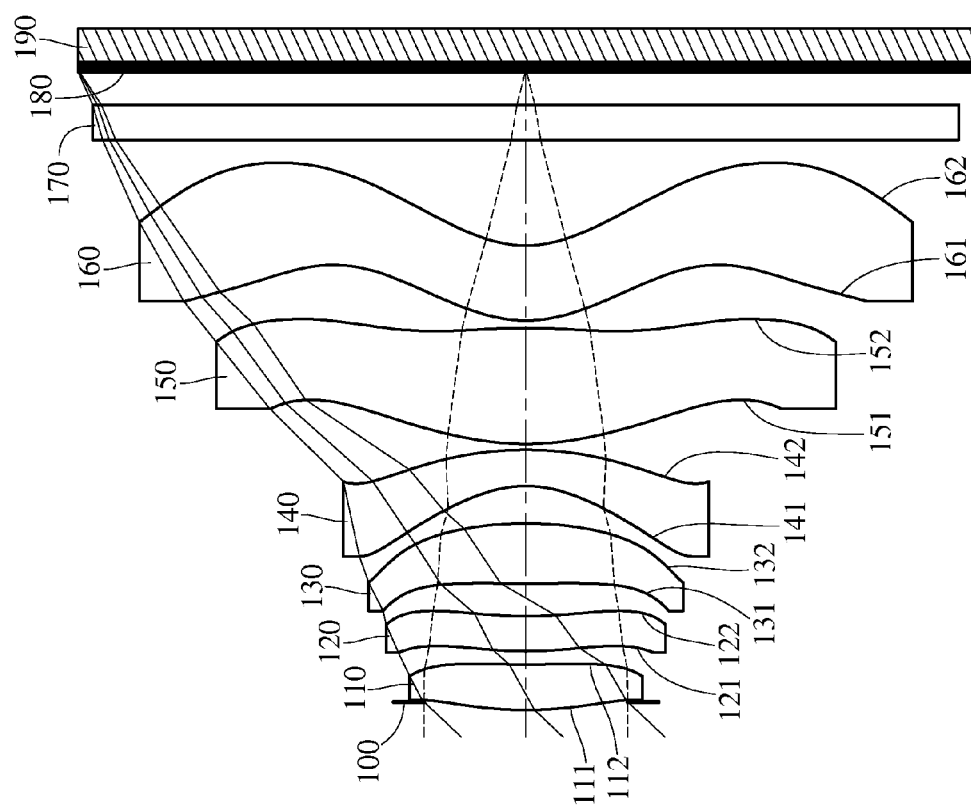
FIG. 1 is a schematic view of an image capturing unit according to the 1st embodiment of the present disclosure.

A photographing optical lens assembly includes, in order from an object side to an image side, a first lens element, a second lens element, a third lens element, a fourth lens element, a fifth lens element and a sixth lens element. The photographing optical lens assembly has a total of six lens elements with refractive power.

According to the photographing optical lens assembly of the present disclosure, an air gap in a paraxial region is arranged between every two of the first lens element, the second lens element, the third lens element, the fourth lens element, the fifth lens element and the sixth lens element that are adjacent to each other, that is, each of the first through sixth lens elements of the photographing optical lens assembly is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality of the photographing optical lens assembly. Therefore, there is an air gap in a paraxial region between every two of the first lens element, the second lens element, the third lens element, the fourth lens element, the fifth lens element and the sixth lens element that are adjacent to each other in the present disclosure for solving the problem generated by the cemented lens elements.

The first lens element can have positive refractive power. The first lens element has an object-side surface being convex in a paraxial region thereof. Therefore, the first lens element provides the photographing optical lens assembly with the positive refractive power as the photographing optical lens assembly needs to be. Furthermore, it is favorable for properly adjusting a total track length of the photographing optical lens assembly.

The second lens element can have positive refractive power. The second lens element can have an object-side surface being convex in a paraxial region thereof and an image-side surface being concave in a paraxial region thereof. The image-side surface of the second lens element can have at least one convex shape in an off-axis region thereof. Therefore, it is favorable for reducing the sensitivity of the photographing optical lens assembly. Furthermore, it is favorable for reducing spherical aberration and correcting the aberration of the off-axis.

The third lens element with positive refractive power can have an image-side surface being convex in a paraxial region thereof. Therefore, it is favorable for further reducing the sensitivity of the photographing optical lens assembly and correcting the spherical aberration of the photographing optical lens assembly.

The fourth lens element can have negative refractive power. The fourth lens element can have an object-side surface being concave in a paraxial region thereof and an image-side surface being convex in a paraxial region thereof. Therefore, it is favorable for effectively correcting the Petzval's sum of the photographing optical lens assembly so as to improve the flatness of the image surface.

The fifth lens element with positive refractive power can have an object-side surface being convex in a paraxial region thereof and an image-side surface being convex in a paraxial region thereof. The object-side surface of the fifth lens element can have at least one inflection point, and the image-side surface of the fifth lens element can have at least one inflection point. Therefore, it is favorable for effectively correcting the spherical aberration of the photographing optical lens assembly and the aberration of the off-axis.

The sixth lens element with positive refractive power has an object-side surface being convex in a paraxial region thereof and an image-side surface being concave in a paraxial region thereof. The image-side surface of the sixth lens element has at least one inflection point. Therefore, it is favorable for distributing the refractive powers of the photographing optical lens assembly with the fifth lens element having positive refractive power so as to avoid overloading the refractive power on one single lens element, whereby it is favorable for avoiding excessive aberration. Furthermore, it is favorable for effectively reducing the total track length of the photographing optical lens assembly and correcting the astigmatism and the distortion of the off-axis.

When a central thickness of the fifth lens element is CT5, a central thickness of the sixth lens element is CT6, the following condition is satisfied: $CT6/CT5<2.5$. Therefore, it is favorable for adjusting the thicknesses of the fifth lens element and the sixth lens element so as to reduce the total track length of the photographing optical lens assembly. Furthermore, it provides favorable moldability and homogeneity for the fifth and the sixth lens elements during the injection molding process. Preferably, the following condition is satisfied: $CT6/CT5<1.5$. More preferably, the following condition is satisfied: $CT6/CT5<0.90$.

When an axial distance between the object-side surface of the first lens element and an image surface is TL, a maximum image height of the photographing optical lens assembly (half of a diagonal length of an effective photosensitive area of an image sensor) is ImgH, the following condition is satisfied: $TL/ImgH<3.0$. Therefore, it is favorable for keeping the photographing optical lens assembly compact so as to be equipped in an electronic device. Preferably, the following condition is satisfied: $TL/ImgH<2.0$.

When a focal length of the first lens element is f1, a focal length of the sixth lens element is f6, the following condition is satisfied: $0<f1<f6$. Therefore, it is favorable for properly distributing the positive refractive powers of the first lens element and the sixth lens element so as to suppress the aberration of the photographing optical lens assembly and reduce the total track length of the photographing optical lens assembly.

When a focal length of the photographing optical lens assembly is f, a focal length of the fifth lens element is f5, the focal length of the sixth lens element is f6, the following condition is satisfied: $0<(f5*f6)/[f*(f5+f6)]<1.15$. Therefore, it is favorable for evenly distributing the refractive powers of the photographing optical lens assembly so as to avoid overloading the refractive power on one single lens element, thereby avoiding excessive aberration.

When a curvature radius of an object-side surface of the third lens element is R5, a curvature radius of the image-side surface of the third lens element is R6, the following condition is satisfied: $-0.5<R6/R5$. Therefore, it is favorable for correcting the spherical aberration and the astigmatism of the photographing optical lens assembly.

When the focal length of the photographing optical lens assembly is f, the focal length of the first lens element is f1, a focal length of the second lens element is f2, the focal length of the sixth lens element is f6, the following condition is satisfied: $|f/f1|+|f/f2|+|f/f6|<1.0$. Therefore, it is favorable for balancing the arrangement of the refractive powers of the first lens element, the second lens element and the sixth lens element so as to reduce the aberration and the sensitivity of the photographing optical lens assembly.

When the focal length of the fifth lens element is f5, the focal length of the sixth lens element is f6, the following condition is satisfied: $0<f5/f6<0.70$. Therefore, it is favorable for avoiding overloading the refractive power on a single lens element so as to avoid excessive aberration. Furthermore, it is favorable for the principal point of the photographing optical lens assembly being positioned towards the image surface of the photographing optical lens assembly so as to enlarge the field of view.

When the focal length of the photographing optical lens assembly is f, a maximum effective radius of the image-side surface of the sixth lens element is Y62, the following condition is satisfied: $0.90<f/Y62<1.30$. Therefore, it is favorable for keeping the photographing optical lens assembly compact and reducing a space for assembling the lens elements as the photographing optical lens assembly needs to be. Please refer to FIG. 15, FIG. 15 shows a schematic view of Y52 of a fifth lens element and Y61, Y62 of a sixth lens element in FIG. 1.

The fourth lens element has the strongest refractive power among the first lens element, the second lens element, the third lens element, the fourth lens element, the fifth lens element and the sixth lens element (a refractive power of a lens element is defined as a ratio of a focal length of the photographing optical lens assembly to a focal length of the lens element). In other words, an absolute value (scalar) of the refractive power of the fourth lens element is the maximum among the first lens element, the second lens element, the third lens element, the fourth lens element, the fifth lens element and the sixth lens element. Therefore, the fourth lens element with negative refractive power is favorable for balancing the arrangement of the refractive power of the photographing optical lens assembly with the lens elements having positive refractive power. Furthermore, it is also favorable for effectively correcting the aberration of the photographing optical lens assembly.

When a sum of axial distances between every two lens elements adjacent to each other is $\Sigma AT$ (that is, a sum of an axial distance between the first lens element and the second lens element, an axial distance between the second lens element and the third lens element, an axial distance between the third lens element and the fourth lens element, an axial distance between the fourth lens element and the fifth lens element, and an axial distance between the fifth lens element and the sixth lens element is $\Sigma AT$), an axial distance between the object-side surface of the first lens element and the image-side surface of the sixth lens element is TD, the following condition is satisfied: ΣAT/TD<0.35. Therefore, it is favorable for keeping the lens elements of the photographing optical lens assembly more compact. Furthermore, it is favorable for assembling the photographing optical lens assembly so as to increase the manufacturing yield rate.

When an Abbe number of the fourth lens element is V4, the following condition is satisfied: V4<28. Therefore, it is favorable for correcting the chromatic aberration of the photographing optical lens assembly.

When a curvature radius of the object-side surface of the first lens element is R1, a curvature radius of an image-side surface of the first lens element is R2, the following condition is satisfied: |(R1+R2)/(R1−R2)|<4.0. Therefore, it is favorable for reducing the spherical aberration and the astigmatism so as to improve the image quality.

When a central thickness of the third lens element is CT3, a central thickness of the fourth lens element is CT4, the following condition is satisfied: CT4/CT3<0.70. Therefore, the thicknesses of the third lens element and the fourth lens element are properly arranged. Furthermore, it provides favorable moldability and homogeneity for the third and the fourth lens elements during the injection molding process.

When the photographing optical lens assembly further includes a stop, an axial distance between the stop and the image-side surface of the sixth lens element is SD, the axial distance between the object-side surface of the first lens element and the image-side surface of the sixth lens element is TD, the following condition is satisfied: 0.8<SD/TD<1.2. Therefore, it is favorable for obtaining a balance between the telecentric and wide-angle characteristics.

When a curvature radius of the image-side surface of the fourth lens element is R8, a curvature radius of the object-side surface of the fifth lens element is R9, the following condition is satisfied: R8/R9<0. Therefore, the curvatures of the fourth lens element and the fifth lens element are properly arranged, so that it is favorable for further correcting the astigmatism of the photographing optical lens assembly so as to increase the image quality at the peripheral region of the image.

When a vertical distance between a non-axial critical point on the object-side surface of the sixth lens element and an optical axis is Yc61, a vertical distance between a non-axial critical point on the image-side surface of the sixth lens element and the optical axis is Yc62, the following condition is satisfied: 0.5<Yc61/Yc62<1.0. Therefore, it is favorable for effectively reducing the incident angle of the light projecting onto the image sensor so as to improve the image-sensing efficiency of the image sensor. Furthermore, it is favorable for further correcting the aberration of the off-axis.

When the focal length of the first lens element is f1, a focal length of the third lens element is f3, the following condition is satisfied: −0.10<f3/f1<0.80. Therefore, it is favorable for balancing the arrangement of the refractive powers of the photographing optical lens assembly at the object side so as to avoid excessive spherical aberration and reduce the sensitivity of the photographing optical lens assembly.

When the focal length of the third lens element is f3, the focal length of the sixth lens element is f6, the following condition is satisfied: 0<f3/f6<0.5. Therefore, it is favorable for balancing the arrangement of the positive refractive powers of the third lens element and the sixth lens element so as to avoid excessive aberration, thereby increasing the image quality.

When a maximum effective radius of the image-side surface of the fifth lens element is Y52, a maximum effective radius of the object-side surface of the sixth lens element is Y61, and the following condition is satisfied: 0.88<Y52/Y61<1.05. Therefore, it is favorable for effectively reducing the incident angle of the light projecting onto the image sensor so as to improve the image-sensing efficiency of the image sensor, whereby it is favorable for increasing the image quality and correcting the aberration of the off-axis.

According to the photographing optical lens assembly of the present disclosure, an aperture stop can be configured as a front stop or a middle stop. A front stop disposed between an imaged object and the first lens element can provide a longer distance between an exit pupil of the photographing optical lens assembly and the image surface and thereby improves the image-sensing efficiency of an image sensor (for example, CCD or CMOS). A middle stop disposed between the first lens element and the image surface is favorable for enlarging the field of view of the photographing optical lens assembly and thereby provides a wider field of view for the same.

According to the photographing optical lens assembly of the present disclosure, the lens elements thereof can be made of glass or plastic material. When the lens elements are made of glass material, the distribution of the refractive power of the photographing optical lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing optical lens assembly can also be reduced.

According to the photographing optical lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the photographing optical lens assembly of the present disclosure, an image surface of the photographing optical lens assembly, based on the corresponding image sensor, can be flat or curved, especially a curved surface being concave facing towards the object side of the photographing optical lens assembly.

According to the photographing optical lens assembly of the present disclosure, a critical point on a lens surface of a lens element is a non-axial point of the lens surface where its tangent is perpendicular to an optical axis. As seen in FIG. 15, FIG. 15 shows a schematic view of Yc61 and Yc62 of a sixth lens element of FIG. 1. The critical point on the object-side surface of the sixth lens element is a non-axial point on the object-side surface of the sixth lens element where its tangent is perpendicular to the optical axis. Furthermore, the critical point on the image-side surface of the sixth lens element is a non-axial point on the image-side surface of the sixth lens element where its tangent is perpendicular to the optical axis. Specifically, the critical points mentioned above are not located on the optical axis.

According to the photographing optical lens assembly of the present disclosure, the photographing optical lens assembly can include at least one stop, such as an aperture stop, a glare stop or a field stop. Said glare stop or said field stop is set for eliminating the stray light and thereby improving the image quality thereof.

According to the present disclosure, an image capturing unit is provided. The image capturing unit includes the photographing optical lens assembly according to the aforementioned photographing optical lens assembly of the present disclosure, and an image sensor, wherein the image sensor is disposed on the image side of the aforementioned photographing optical lens assembly, that is, the image sensor can be disposed on or near an image surface of the aforementioned photographing optical lens assembly. In some embodiments, the image capturing unit can further include a barrel member, a holding member or a combination thereof.

Figure 17:
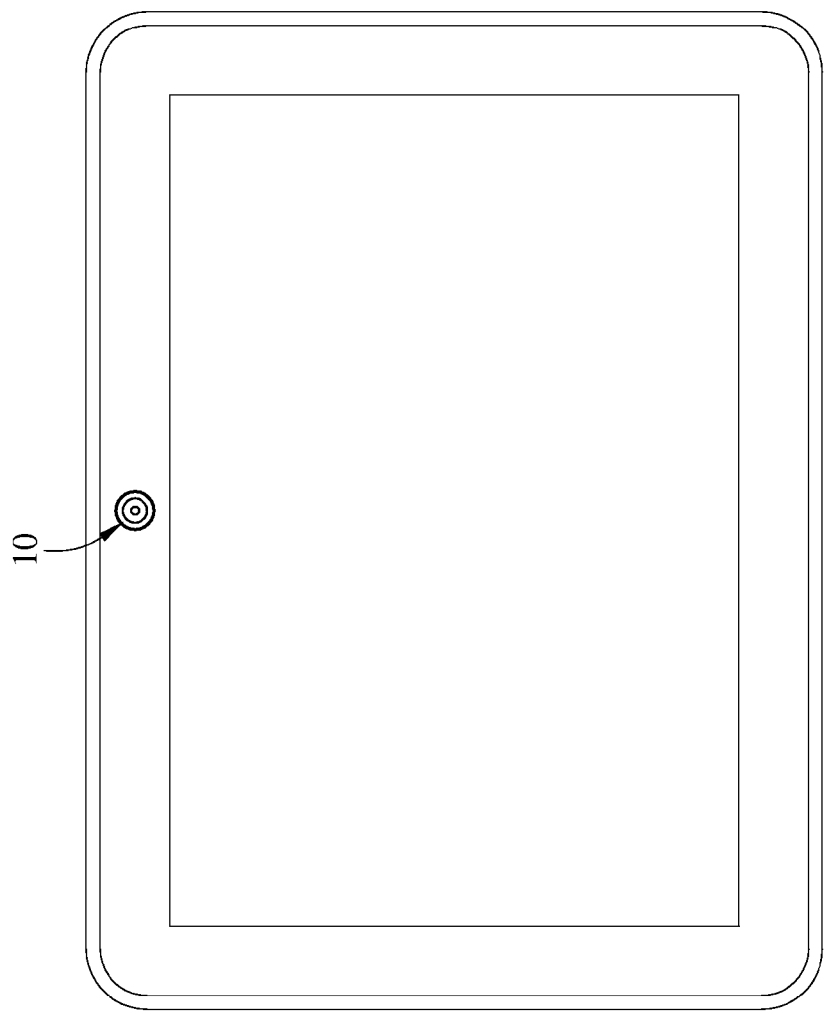
FIG. 17 shows an electronic device according to another embodiment.
Figure 16:
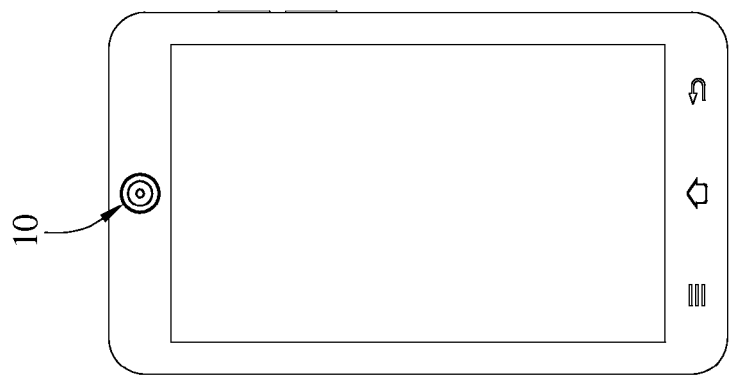
FIG. 16 shows an electronic device according to one embodiment.
Figure 18:
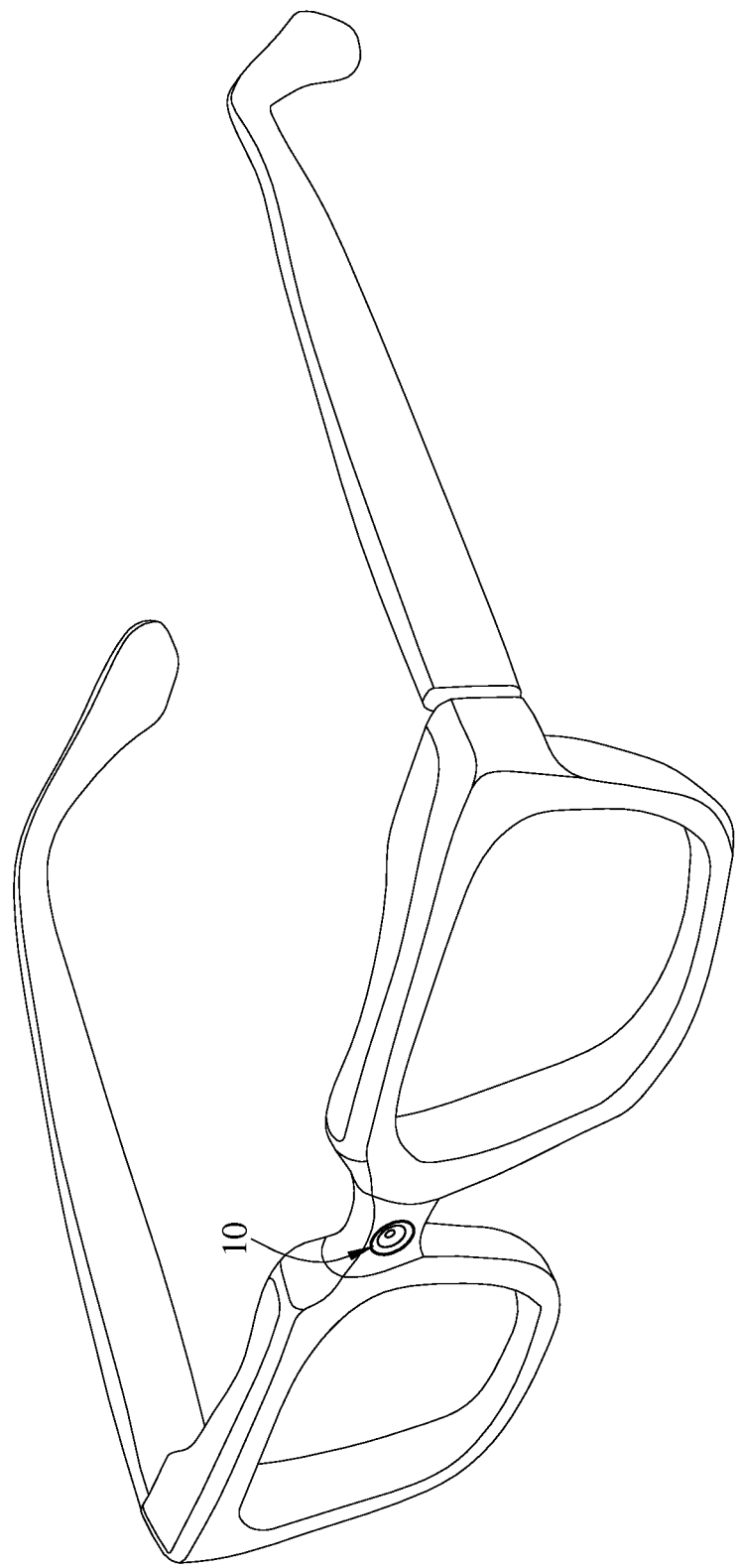
FIG. 18 shows an electronic device according to still another embodiment.

In FIG. 16, FIG. 17 and FIG. 18, an image capturing device 10 may be installed in, but not limited to, an electronic device, including a smart phone (FIG. 16), a tablet personal computer (FIG. 17) or a wearable device (FIG. 18). The three exemplary figures of different kinds of electronic device are only exemplary for showing the image capturing device of present disclosure installing in an electronic device and is not limited thereto. In some embodiments, the electronic device can further include, but not limited to, a display unit, a control unit, a storage unit, a random access memory unit (RAM), a read only memory unit (ROM) or a combination thereof.

According to the photographing optical lens assembly of the present disclosure, the photographing optical lens assembly can be optionally applied to moving focus optical systems. Furthermore, the photographing optical lens assembly is featured with good capability in the correction of aberration and high image quality, and can be applied to 3D (three-dimensional) image capturing applications, in products such as digital cameras, mobile devices, digital tablets, wearable devices, smart televisions, wireless monitoring devices, motion sensing input devices, driving recorders, rear view cameras and other electronic imaging devices. According to the above description of the present disclosure, the following specific embodiments are provided for further explanation.

1st Embodiment

Figure 2:
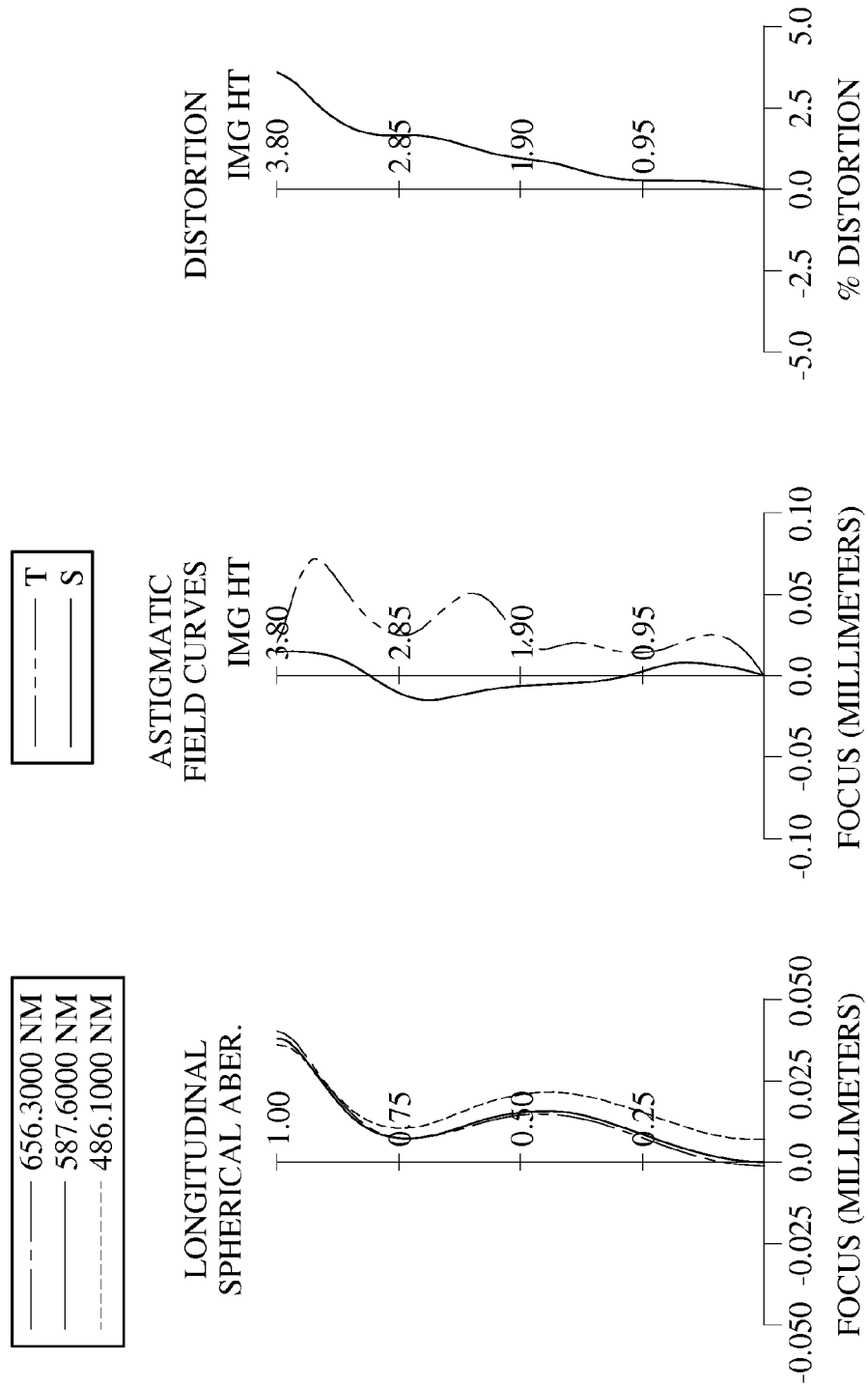
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 190. The photographing optical lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image surface 180, wherein the photographing optical lens assembly has a total of six non-cemented lens elements (110-160) with refractive power. There is an air gap in a paraxial region between every two of the first lens element 110, the second lens element 120, the third lens element 130, the fourth lens element 140, the fifth lens element 150 and the sixth lens element 160 that are adjacent to each other. The fourth lens element 140 has the strongest refractive power among the first lens element 110, the second lens element 120, the third lens element 130, the fourth lens element 140, the fifth lens element 150 and the sixth lens element 160.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric. The image-side surface 122 of the second lens element 120 has at least one convex shape in an off-axis region thereof.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric.

The fourth lens element 140 with negative refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has at least one inflection point. The image-side surface 152 of the fifth lens element 150 has at least one inflection point.

The sixth lens element 160 with positive refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one inflection point.

The IR-cut filter 170 is made of glass and located between the sixth lens element 160 and the image surface 180, and will not affect the focal length of the photographing optical lens assembly. The image sensor 190 is disposed on or near the image surface 180 of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing optical lens assembly of the image capturing unit according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=3.47 mm; Fno=2.00; and HFOV=46.5 degrees.

When an Abbe number of the fourth lens element 140 is V4, the following condition is satisfied: V4=23.3.

When a central thickness of the third lens element 130 is CT3, a central thickness of the fourth lens element 140 is CT4, the following condition is satisfied: CT4/CT3=0.60.

When a central thickness of the fifth lens element 150 is CT5, a central thickness of the sixth lens element 160 is CT6, the following condition is satisfied: CT6/CT5=0.64.

When a curvature radius of the object-side surface 111 of the first lens element 110 is R1, a curvature radius of the image-side surface 112 of the first lens element 110 is R2, the following condition is satisfied: |(R1+R2)/(R1−R2)|=1.90.

When a curvature radius of the object-side surface 131 of the third lens element 130 is R5, a curvature radius of the image-side surface 132 of the third lens element 130 is R6, the following condition is satisfied: R6/R5=−0.11.

When a curvature radius of the image-side surface 142 of the fourth lens element 140 is R8, a curvature radius of the object-side surface 151 of the fifth lens element 150 is R9, the following condition is satisfied: R8/R9=−1.26.

When a focal length of the first lens element 110 is f1, a focal length of the third lens element 130 is f3, the following condition is satisfied: f3/f1=0.63.

When a focal length of the fifth lens element 150 is f5, a focal length of the sixth lens element 160 is f6, the following condition is satisfied: f5/f6=0.03.

When the focal length of the third lens element 130 is f3, the focal length of the sixth lens element 160 is f6, the following condition is satisfied: f3/f6=0.05.

When the focal length of the photographing optical lens assembly is f, the focal length of the first lens element 110 is f1, a focal length of the second lens element 120 is f2, the focal length of the sixth lens element 160 is f6, the following condition is satisfied: |f/f1|+|f/f2|+|f/f6|=0.55.

When the focal length of the photographing optical lens assembly is f, the focal length of the fifth lens element 150 is f5, the focal length of the sixth lens element 160 is f6, the following condition is satisfied: (f5*f6)/[f*(f5+f6)]=0.88.

When the focal length of the photographing optical lens assembly is f, a maximum effective radius of the image-side surface 162 of the sixth lens element 160 is Y62, the following condition is satisfied: f/Y62=1.05.

When a maximum effective radius of the image-side surface 152 of the fifth lens element 150 is Y52, a maximum effective radius of the object-side surface 161 of the sixth lens element 160 is Y61, the following condition is satisfied: Y52/Y61=0.91.

When a vertical distance between a non-axial critical point on the object-side surface 161 of the sixth lens element 160 and an optical axis is Yc61, a vertical distance between a non-axial critical point on the image-side surface 162 of the sixth lens element 160 and the optical axis is Yc62, the following condition is satisfied: Yc61/Yc62=0.78.

When a sum of axial distances between every two lens elements adjacent to each other is ΣAT, an axial distance between the object-side surface 111 of the first lens element 110 and the image-side surface 162 of the sixth lens element 160 is TD, the following condition is satisfied: ΣAT/TD=0.21.

When an axial distance between the stop 100 and the image-side surface 162 of the sixth lens element 160 is SD, the axial distance between the object-side surface 111 of the first lens element 110 and the image-side surface 162 of the sixth lens element 160 is TD, the following condition is satisfied: SD/TD=0.98.

When an axial distance between the object-side surface 111 of the first lens element 110 and the image surface 180 is TL, a maximum image height of the photographing optical lens assembly is ImgH, the following condition is satisfied: TL/ImgH=1.43.

The detailed optical data of the 1st embodiment are shown in Table 1 and the aspheric surface data are shown in Table 2 below.

TABLE 1

1st Embodiment
f = 3.47 mm, Fno = 2.00, HFOV = 46.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.070 | | | | |
| 2 | Lens 1 | 3.166 (ASP) | 0.387 | Plastic | 1.535 | 55.7 | 8.41 |
| 3 | | 10.223 (ASP) | 0.114 | | | | |
| 4 | Lens 2 | 3.294 (ASP) | 0.299 | Plastic | 1.544 | 55.9 | 31.56 |
| 5 | | 3.945 (ASP) | 0.278 | | | | |
| 6 | Lens 3 | 28.466 (ASP) | 0.511 | Plastic | 1.544 | 55.9 | 5.30 |
| 7 | | −3.187 (ASP) | 0.320 | | | | |
| 8 | Lens 4 | −0.961 (ASP) | 0.308 | Plastic | 1.640 | 23.3 | −2.37 |
| 9 | | −2.952 (ASP) | 0.050 | | | | |
| 10 | Lens 5 | 2.340 (ASP) | 0.988 | Plastic | 1.530 | 55.8 | 3.15 |
| 11 | | −4.992 (ASP) | 0.064 | | | | |
| 12 | Lens 6 | 1.140 (ASP) | 0.637 | Plastic | 1.544 | 55.9 | 114.63 |
| 13 | | 0.933 (ASP) | 0.900 | | | | |
| 14 | IR-cut filter | Plano | 0.300 | Glass | 1.517 | 64.2 | — |
| 15 | | Plano | 0.276 | | | | |
| 16 | Image | Plano | — | | | | |

Note:
Reference wavelength is 587.6 nm (d-line),

TABLE 2

Aspheric Coefficients

| Surface # | 2 | 3 | 4 | 5 | 6 | 7 |
|---|---|---|---|---|---|---|
| k = | −1.1137E+00 | −2.7433E+01 | −9.6562E+00 | −1.1618E+00 | 2.1387E+01 | 1.1940E+00 |
| A4 = | −2.9165E−02 | −1.1043E−01 | −9.3525E−02 | −7.1604E−02 | −5.4285E−02 | −1.1556E−02 |
| A6 = | −1.2874E−02 | −1.0301E−02 | 3.2873E−03 | −1.8194E−02 | −4.4670E−02 | −4.1511E−02 |
| A8 = | −2.2034E−02 | −2.7759E−02 | −4.6235E−02 | −3.0644E−02 | 6.4197E−02 | 3.0992E−02 |
| A10 = | −1.9965E−02 | −2.0689E−03 | 2.3713E−02 | 3.1673E−02 | −1.1852E−01 | −2.5919E−02 |
| A12 = | — | — | 1.0951E−08 | −1.4089E−02 | 8.0391E−02 | 5.1838E−04 |
| A14 = | — | — | — | — | −1.9852E−02 | 3.8679E−03 |

| Surface # | 8 | 9 | 10 | 11 | 12 | 13 |
|---|---|---|---|---|---|---|
| k = | −1.3774E+00 | −1.0102E+00 | −1.2557E+01 | 1.0488E−01 | −3.0593E+00 | −2.8319E+00 |
| A4 = | 2.1700E−01 | −1.1563E−02 | 3.3795E−02 | 1.1467E−01 | −1.0161E−02 | −8.6363E−03 |
| A6 = | −2.8958E−01 | 1.4986E−02 | −1.2575E−02 | −3.6882E−02 | −1.6726E−02 | −1.2822E−02 |
| A8 = | 2.9546E−01 | −1.1650E−02 | 4.2777E−04 | 4.8656E−03 | 2.9674E−03 | 4.3598E−03 |
| A10 = | −2.0388E−01 | 8.0514E−03 | 1.5253E−04 | −1.5172E−04 | 1.9611E−04 | −6.9063E−04 |
| A12 = | 7.8790E−02 | −2.0137E−03 | −1.4303E−05 | −2.2765E−05 | −9.0837E−05 | 5.8808E−05 |
| A14 = | −1.1806E−02 | 2.6949E−04 | −1.9388E−07 | 1.4770E−06 | 8.2404E−06 | −2.5867E−06 |
| A16 = | — | — | — | — | −2.4714E−07 | 4.6249E−08 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
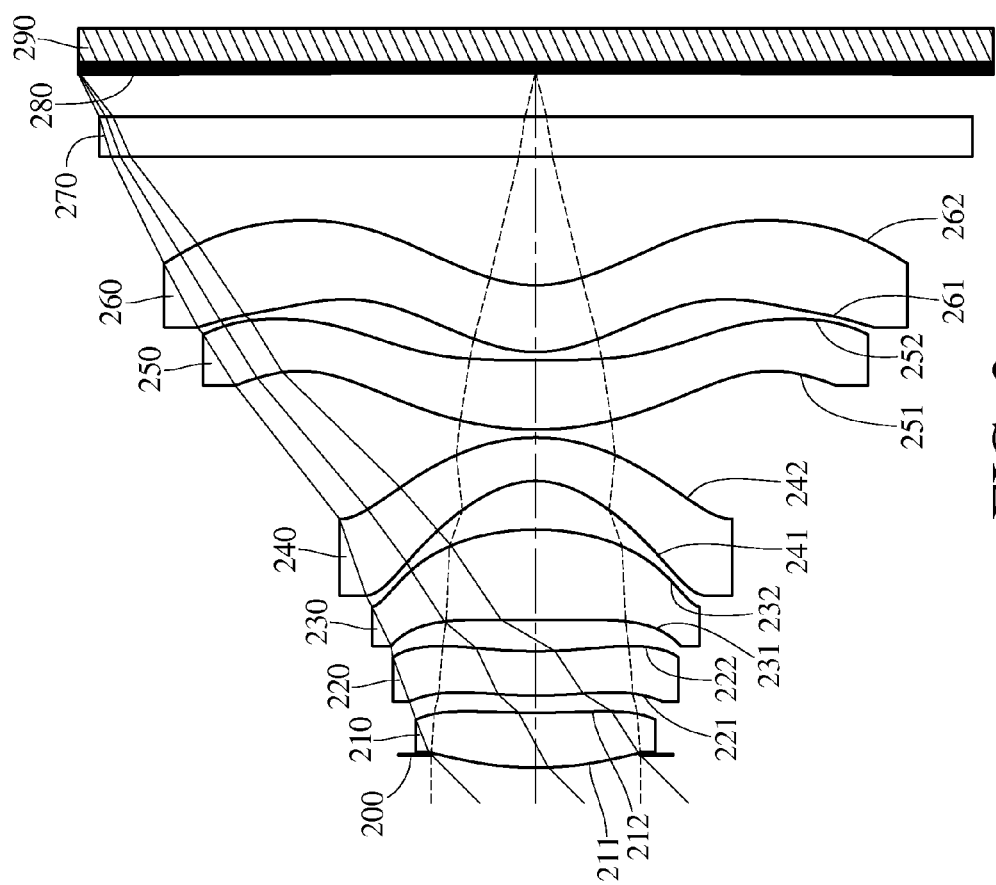
FIG. 3 is a schematic view of an image capturing unit according to the 2nd embodiment of the present disclosure.
Figure 4:
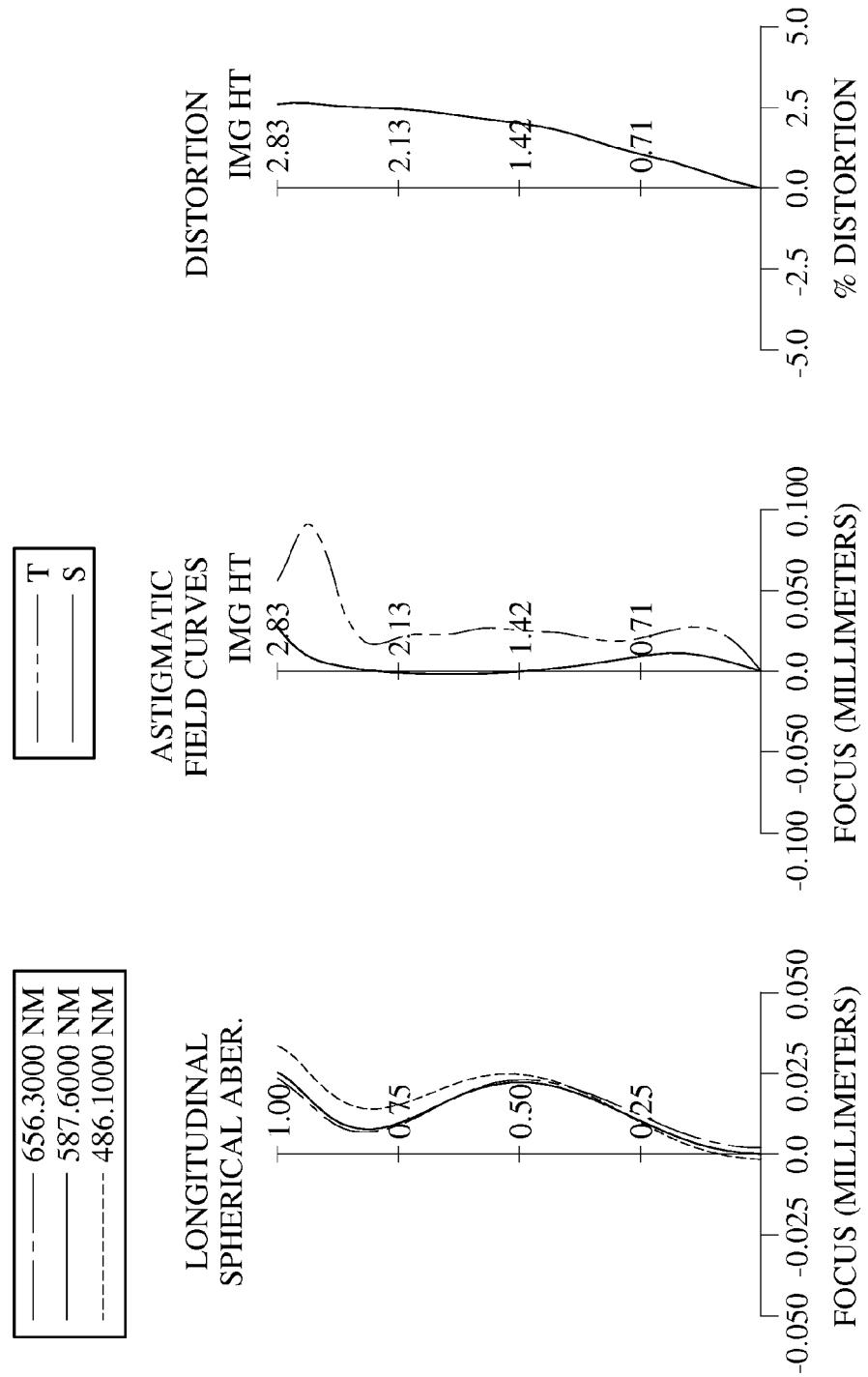
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 290. The photographing optical lens assembly includes, in order from an object side to an image side an aperture stop 200, a first lens element 210, a second lens element 220, a third lens element 230, a fourth lens element 240, a fifth lens element 250, a sixth lens element 260, an IR-cut filter 270 and an image surface 280, wherein the photographing optical lens assembly has a total of six non-cemented lens elements (210-260) with refractive power. There is an air gap in a paraxial region between every two of the first lens element 210, the second lens element 220, the third lens element 230, the fourth lens element 240, the fifth lens element 250 and the sixth lens element 260 that are adjacent to each other. The fourth lens element 240 has the strongest refractive power among the first lens element 210, the second lens element 220, the third lens element 230, the fourth lens element 240, the fifth lens element 250 and the sixth lens element 260.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. The image-side surface 222 of the second lens element 220 has at least one convex shape in an off-axis region thereof.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with positive refractive power has an object-side surface 251 being convex in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has at least one inflection point. The image-side surface 252 of the fifth lens element 250 has at least one inflection point.

The sixth lens element 260 with positive refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has at least one inflection point.

The IR-cut filter 270 is made of glass and located between the sixth lens element 260 and the image surface 280, and will not affect the focal length of the photographing optical lens assembly. The image sensor 290 is disposed on or near the image surface 280 of the photographing optical lens assembly.

The detailed optical data of the 2nd embodiment are shown in Table 3 and the aspheric surface data are shown in Table 4 below.

TABLE 3

2nd Embodiment
f = 2.75 mm, Fno = 2.12, HFOV = 45.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.080 | | | | |
| 2 | Lens 1 | 2.066 (ASP) | 0.342 | Plastic | 1.535 | 55.7 | 6.24 |
| 3 | | 5.103 (ASP) | 0.108 | | | | |
| 4 | Lens 2 | 3.039 (ASP) | 0.275 | Plastic | 1.639 | 23.5 | −118.50 |
| 5 | | 2.818 (ASP) | 0.197 | | | | |
| 6 | Lens 3 | 61.418 (ASP) | 0.560 | Plastic | 1.544 | 55.9 | 2.73 |
| 7 | | −1.519 (ASP) | 0.303 | | | | |
| 8 | Lens 4 | −0.511 (ASP) | 0.270 | Plastic | 1.639 | 23.5 | −1.79 |
| 9 | | −1.114 (ASP) | 0.050 | | | | |
| 10 | Lens 5 | 1.948 (ASP) | 0.433 | Plastic | 1.544 | 55.9 | 3.52 |
| 11 | | −102.384 (ASP) | 0.050 | | | | |
| 12 | Lens 6 | 0.813 (ASP) | 0.415 | Plastic | 1.535 | 55.7 | 7.87 |
| 13 | | 0.828 (ASP) | 0.800 | | | | |
| 14 | IR-cut filter | Plano | 0.250 | Glass | 1.517 | 64.2 | — |
| 15 | | Plano | 0.269 | | | | |
| 16 | Image | −500.000 | — | | | | |

Note: Reference wavelength is 587.6 nm (d-line).

TABLE 4

Aspheric Coefficients

| Surface # | 2 | 3 | 4 | 5 | 6 | 7 |
|---|---|---|---|---|---|---|
| k = | 6.3590E−01 | −5.5202E+00 | −1.5755E+01 | −6.3157E+00 | 9.0000E+01 | 1.0676E+00 |
| A4 = | −4.4231E−02 | −2.4252E−01 | −2.9424E−01 | −2.0003E−01 | −9.4984E−02 | 6.6856E−03 |
| A6 = | −3.8224E−02 | −3.5150E−02 | 3.5935E−02 | −1.5627E−01 | −2.2385E−01 | −1.9269E−01 |
| A8 = | 5.8353E−03 | −1.3029E−01 | −3.7546E−01 | −3.2507E−01 | 7.3731E−01 | 4.0195E−01 |
| A10 = | −3.0817E−01 | −6.4843E−02 | 4.0872E−01 | 7.4285E−01 | −2.5941E+00 | −5.3524E−01 |
| A12 = | — | — | — | −5.5004E−01 | 3.5132E+00 | 8.3706E−03 |
| A14 = | — | — | — | — | −1.7285E+00 | 3.3483E−01 |
| A16 = | — | — | — | — | — | −2.0109E−05 |

| Surface # | 8 | 9 | 10 | 11 | 12 | 13 |
|---|---|---|---|---|---|---|
| k = | −1.2176E+00 | −1.1188E+00 | −9.3173E+00 | 7.1296E+01 | −3.3527E+00 | −2.9238E+00 |
| A4 = | 5.5403E−01 | −2.5879E−02 | 1.3024E−01 | 2.9987E−01 | −2.9459E−02 | −4.3170E−02 |
| A6 = | −1.6574E+00 | 8.0328E−02 | −7.8320E−02 | −2.0669E−01 | −8.6230E−02 | −6.5488E−02 |
| A8 = | 3.2564E+00 | −1.3491E−01 | 5.3109E−03 | 5.2902E−02 | 3.2177E−02 | 4.8511E−02 |
| A10 = | −4.4595E+00 | 1.7144E−01 | 3.5309E−03 | −3.0069E−03 | 4.1705E−03 | −1.5311E−02 |
| A12 = | 3.4693E+00 | −9.1387E−02 | −6.8294E−04 | −9.0353E−04 | −3.9966E−03 | 2.5706E−03 |
| A14 = | −1.0297E+00 | 2.0748E−02 | 2.8478E−05 | 1.1443E−04 | 7.1793E−04 | −2.2631E−04 |
| A16 = | −3.0191E−04 | — | — | — | −4.1671E−05 | 8.3238E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.75 | f5/f6 | 0.45 |
| Fno | 2.12 | f3/f6 | 0.35 |
| HFOV [deg.] | 45.0 | $|f/f1| + |f/f2| + |f/f6|$ | 0.81 |
| V4 | 23.5 | (f5 * f6)/[f * (f5 + f6)] | 0.88 |
| CT4/CT3 | 0.48 | f/Y62 | 1.19 |
| CT6/CT5 | 0.96 | Y52/Y61 | 0.98 |

-continued

| 2nd Embodiment | | | |
|---|---|---|---|
| $|(R1 + R2)/(R1 - R2)|$ | 2.36 | Yc61/Yc62 | 0.83 |
| R6/R5 | −0.02 | ΣAT/TD | 0.24 |
| R8/R9 | −0.57 | SD/TD | 0.97 |
| f3/f1 | 0.44 | TL/ImgH | 1.52 |

3rd Embodiment

Figure 5:
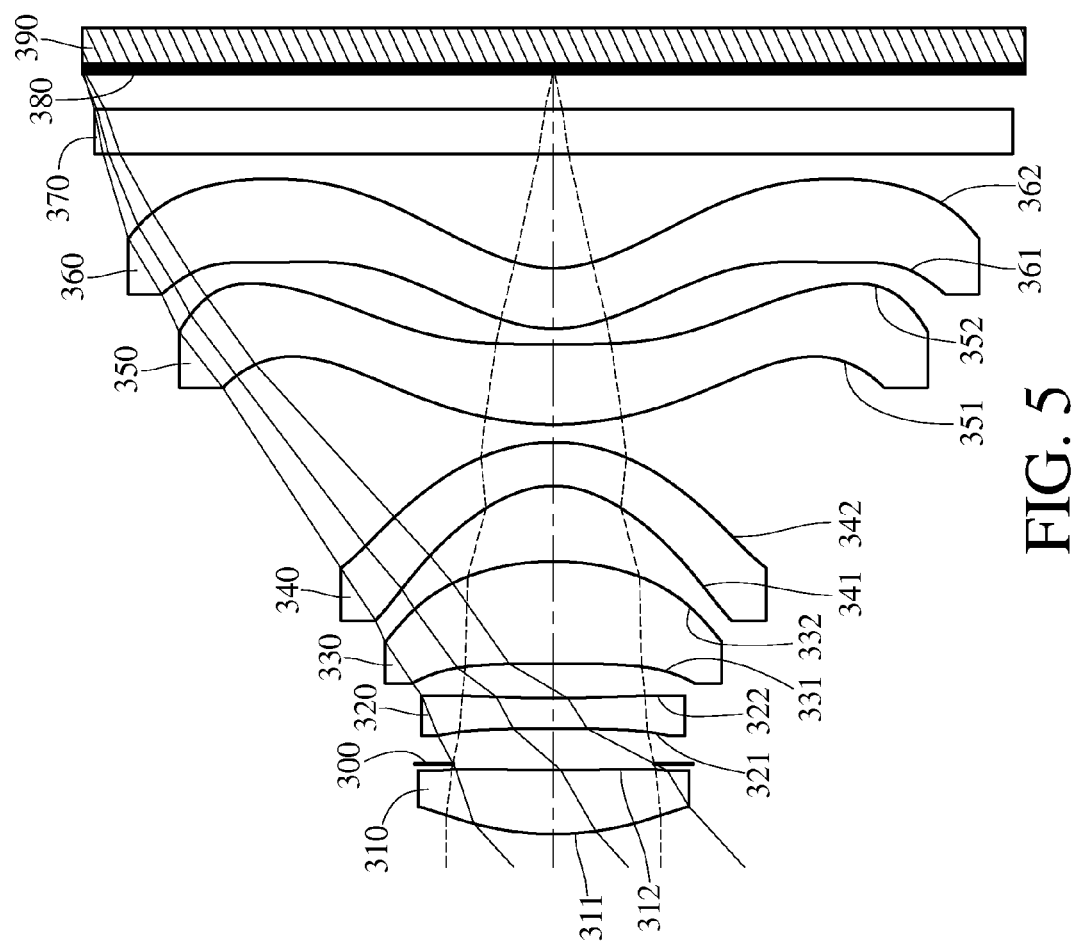
FIG. 5 is a schematic view of an image capturing unit according to the 3rd embodiment of the present disclosure.
Figure 6:
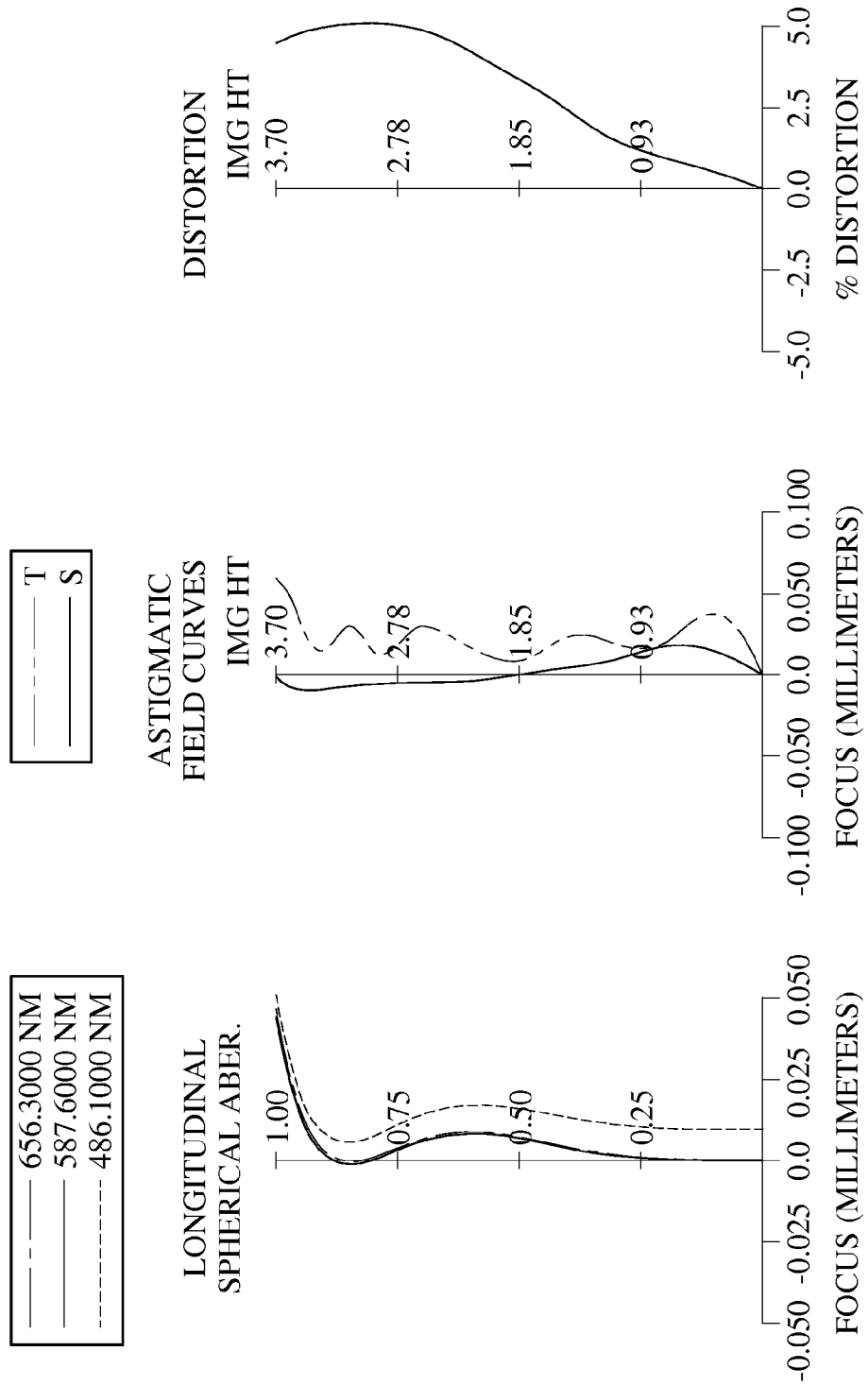
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 390. The photographing optical lens assembly includes, in order from an object side to an image side, a first lens element 310, an aperture stop 300, a second lens element 320, a third lens element 330, a fourth lens element 340, a fifth lens element 350, a sixth lens element 360, an IR-cut filter 370 and an image surface 380, wherein the photographing optical lens assembly has a total of six non-cemented lens elements (310-360) with refractive power. There is an air gap in a paraxial region between every two of the first lens element 310, the second lens element 320, the third lens element 330, the fourth lens element 340, the fifth lens element 350 and the sixth lens element 360 that are adjacent to each other. The fourth lens element 340 has the strongest refractive power among the first lens element 310, the second lens element 320, the third lens element 330, the fourth lens element 340, the fifth lens element 350 and the sixth lens element 360.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric. The image-side surface 322 of the second lens element 320 has at least one convex shape in an off-axis region thereof.

The third lens element 330 with positive refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with positive refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The object-side surface 351 of the fifth lens element 350 has at least one inflection point. The image-side surface 352 of the fifth lens element 350 has at least one inflection point.

The sixth lens element 360 with positive refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The image-side surface 362 of the sixth lens element 360 has at least one inflection point.

The IR-cut filter 370 is made of glass and located between the sixth lens element 360 and the image surface 380, and will not affect the focal length of the photographing optical lens assembly. The image sensor 390 is disposed on or near the image surface 380 of the photographing optical lens assembly.

The detailed optical data of the 3rd embodiment are shown in Table 5 and the aspheric surface data are shown in Table 6 below.

TABLE 5

3rd Embodiment
f = 3.87 mm, Fno = 2.30, HFOV = 42.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.393 (ASP) | 0.503 | Plastic | 1.535 | 55.7 | 5.18 |
| 2 | | 16.334 (ASP) | 0.050 | | | | |
| 3 | Ape. Stop | Plano | 0.276 | | | | |
| 4 | Lens 2 | −54.911 (ASP) | 0.240 | Plastic | 1.634 | 23.8 | −10.05 |
| 5 | | 7.224 (ASP) | 0.273 | | | | |
| 6 | Lens 3 | −25.850 (ASP) | 0.803 | Plastic | 1.535 | 55.7 | 4.11 |
| 7 | | −2.046 (ASP) | 0.595 | | | | |
| 8 | Lens 4 | −0.743 (ASP) | 0.343 | Plastic | 1.650 | 21.4 | −3.25 |
| 9 | | −1.355 (ASP) | 0.141 | | | | |
| 10 | Lens 5 | 2.504 (ASP) | 0.629 | Plastic | 1.530 | 55.8 | 4.93 |
| 11 | | 53.624 (ASP) | 0.122 | | | | |
| 12 | Lens 6 | 1.042 (ASP) | 0.476 | Plastic | 1.530 | 55.8 | 37.87 |
| 13 | | 0.925 (ASP) | 0.900 | | | | |
| 14 | IR-cut filter | Plano | 0.350 | Glass | 1.517 | 64.2 | — |
| 15 | | Plano | 0.275 | | | | |
| 16 | Image | Plano | — | | | | |

Note: Reference wavelength is 587.6 nm (d-line).

TABLE 6

| Aspheric Coefficients | | | | | | |
|---|---|---|---|---|---|---|
| Surface # | 1 | 2 | 4 | 5 | 6 | 7 |
| k = | 7.9736E−01 | 8.8254E+01 | 9.0000E+01 | −3.9522E+01 | 8.8434E+01 | 9.3889E−01 |
| A4 = | −9.6578E−03 | −3.0630E−02 | −8.4087E−02 | −6.5298E−02 | −5.0923E−02 | 3.4805E−03 |
| A6 = | −7.9311E−03 | 7.4552E−03 | 3.2941E−02 | 3.7858E−02 | −4.7298E−02 | −3.6848E−02 |
| A8 = | 5.9158E−04 | −5.0894E−02 | −1.0065E−02 | −2.4432E−02 | 6.3969E−02 | 3.7494E−02 |
| A10 = | −7.1778E−03 | 2.1919E−02 | −1.2582E−02 | 2.3526E−02 | −1.0930E−01 | −2.4363E−02 |

TABLE 6-continued

| Aspheric Coefficients | | | | | |
|---|---|---|---|---|---|
| A12 = −4.4324E−03 | 3.0319E−06 | 1.7462E−09 | −1.1580E−02 | 8.0226E−02 | 2.0501E−04 |
| A14 = — | — | — | — | −1.9485E−02 | 3.8476E−03 |
| A16 = — | — | — | — | — | −1.9500E−05 |

| Surface # | 8 | 9 | 10 | 11 | 12 | 13 |
|---|---|---|---|---|---|---|
| k = | −1.1311E+00 | −1.0052E+00 | −9.3512E+00 | 9.0000E+01 | −3.4763E+00 | −3.0784E+00 |
| A4 = | 1.9229E−01 | −1.2061E−02 | 4.5086E−02 | 1.0435E−01 | −6.8856E−03 | −5.6415E−03 |
| A6 = | −2.9442E−01 | 1.1240E−02 | −1.3185E−02 | −3.5474E−02 | −1.4837E−02 | −1.3557E−02 |
| A8 = | 2.9458E−01 | −1.2840E−02 | 4.3176E−04 | 4.7123E−03 | 2.8711E−03 | 4.4989E−03 |
| A10 = | −2.0314E−01 | 7.7930E−03 | 1.4548E−04 | −1.5125E−04 | 1.8286E−04 | −6.9336E−04 |
| A12 = | 7.8692E−02 | −2.0656E−03 | −1.6337E−05 | −2.1565E−05 | −9.1415E−05 | 5.8328E−05 |
| A14 = | −1.1908E−02 | 2.4669E−04 | 3.9289E−07 | 1.4188E−06 | 8.2404E−06 | −2.5950E−06 |
| A16 = | −4.6125E−07 | — | — | — | −2.3899E−07 | 4.7262E−08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.87 | f5/f6 | 0.13 |
| Fno | 2.30 | f3/f6 | 0.11 |
| HFOV [deg.] | 42.4 | \|f/f1\| + \|f/f2\| + \|f/f6\| | 1.24 |
| V4 | 21.4 | (f5 * f6)/[f * (f5 + f6)] | 1.13 |
| CT4/CT3 | 0.43 | f/Y62 | 1.16 |
| CT6/CT5 | 0.76 | Y52/Y61 | 0.96 |
| \|(R1 + R2)/(R1 − R2)\| | 1.34 | Yc61/Yc62 | 0.86 |
| R6/R5 | 0.08 | ΣAT/TD | 0.33 |
| R8/R9 | −0.54 | SD/TD | 0.88 |
| f3/f1 | 0.79 | TL/ImgH | 1.62 |

4th Embodiment

Figure 7:
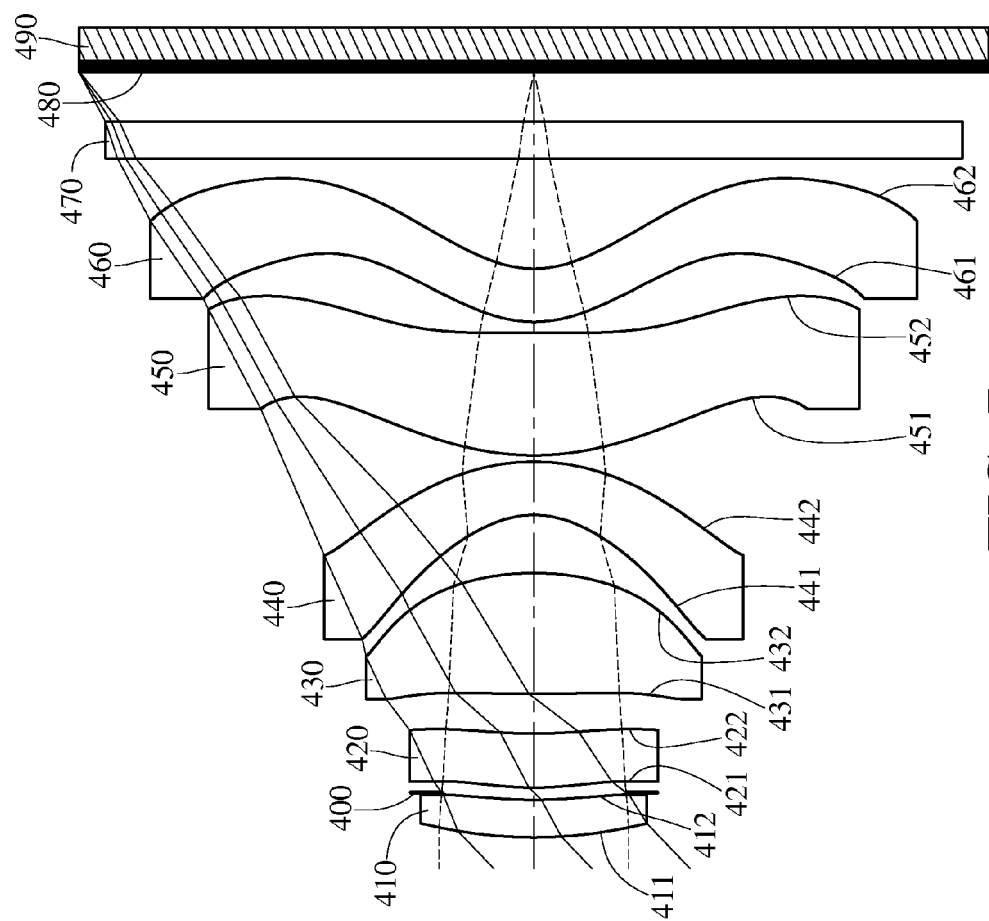
FIG. 7 is a schematic view of an image capturing unit according to the 4th embodiment of the present disclosure.
Figure 8:
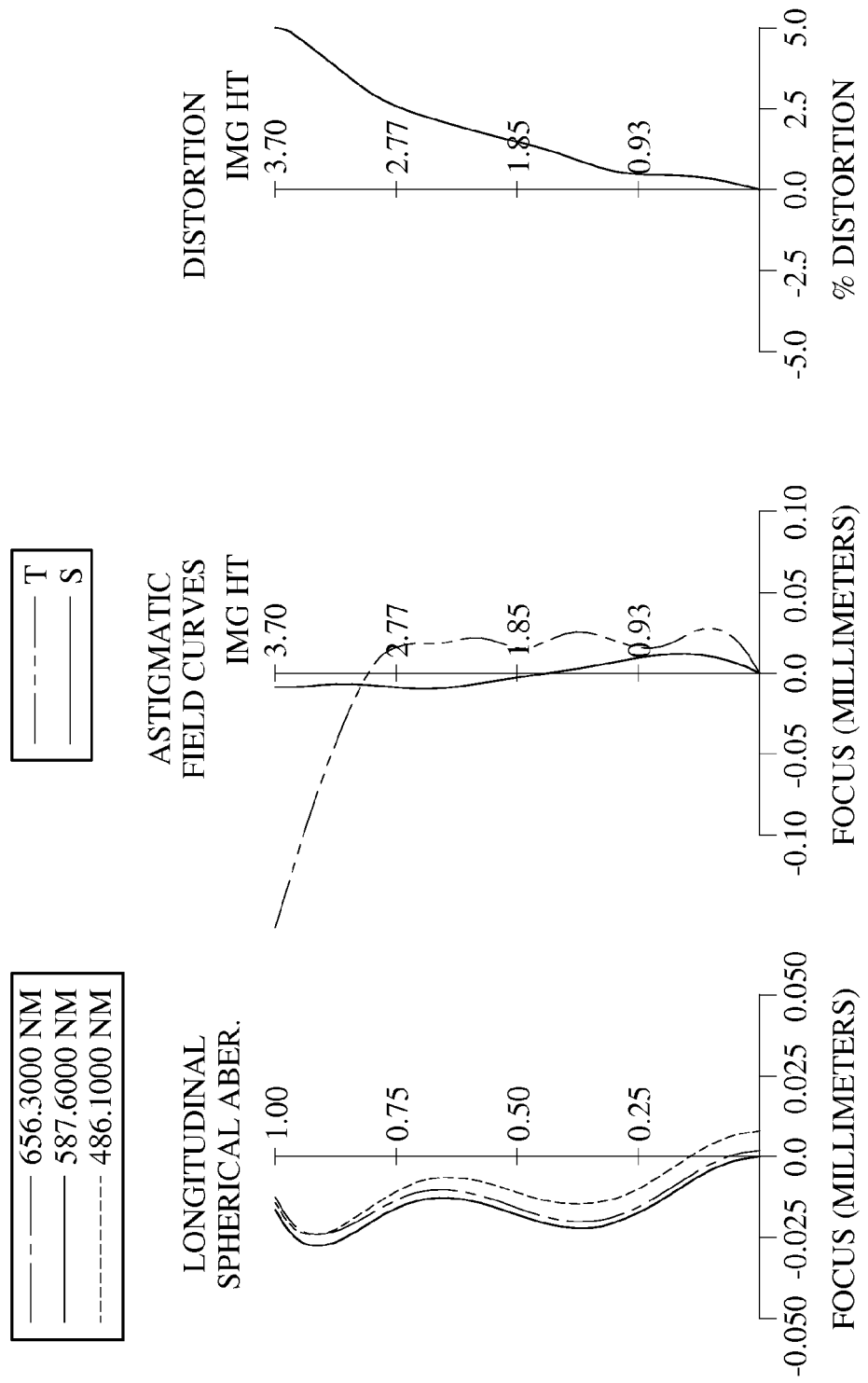
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 490. The photographing optical lens assembly includes, in order from an object side to an image side, a first lens element 410, an aperture stop 400, a second lens element 420, a third lens element 430, a fourth lens element 440, a fifth lens element 450, a sixth lens element 460, an IR-cut filter 470 and an image surface 480, wherein the photographing optical lens assembly has a total of six non-cemented lens elements (410-460) with refractive power. There is an air gap in a paraxial region between every two of the first lens element 410, the second lens element 420, the third lens element 430, the fourth lens element 440, the fifth lens element 450 and the sixth lens element 460 that are adjacent to each other. The fourth lens element 440 has the strongest refractive power among the first lens element 410, the second lens element 420, the third lens element 430, the fourth lens element 440, the fifth lens element 450 and the sixth lens element 460.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric. The image-side surface 422 of the second lens element 420 has at least one convex shape in an off-axis region thereof.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with positive refractive power has an object-side surface 451 being convex in a paraxial region thereof and an image-side surface 452 being convex in a paraxial region thereof. The fifth lens element 450 is made of plastic material and has the object-side surface 451 and the image-side surface 452 being both aspheric. The object-side surface 451 of the fifth lens element 450 has at least one inflection point. The image-side surface 452 of the fifth lens element 450 has at least one inflection point.

The sixth lens element 460 with positive refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has at least one inflection point.

The IR-cut filter 470 is made of glass and located between the sixth lens element 460 and the image surface 480, and will not affect the focal length of the photographing optical lens assembly. The image sensor 490 is disposed on or near the image surface 480 of the photographing optical lens assembly.

The detailed optical data of the 4th embodiment are shown in Table 7 and the aspheric surface data are shown in Table 8 below.

TABLE 7

4th Embodiment
f = 3.71 mm, Fno = 2.40, HFOV = 43.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.570 (ASP) | 0.305 | Plastic | 1.535 | 55.7 | −158.16 |
| 2 | | 3.323 (ASP) | 0.060 | | | | |
| 3 | Ape. Stop | Plano | 0.040 | | | | |
| 4 | Lens 2 | 2.496 (ASP) | 0.441 | Plastic | 1.535 | 55.7 | 11.00 |
| 5 | | 4.067 (ASP) | 0.323 | | | | |
| 6 | Lens 3 | 11.990 (ASP) | 0.984 | Plastic | 1.535 | 55.7 | 3.54 |
| 7 | | −2.187 (ASP) | 0.474 | | | | |
| 8 | Lens 4 | −0.767 (ASP) | 0.433 | Plastic | 1.650 | 21.4 | −2.58 |
| 9 | | −1.730 (ASP) | 0.052 | | | | |
| 10 | Lens 5 | 2.114 (ASP) | 1.000 | Plastic | 1.530 | 55.8 | 3.69 |
| 11 | | −21.500 (ASP) | 0.087 | | | | |
| 12 | Lens 6 | 0.977 (ASP) | 0.433 | Plastic | 1.530 | 55.8 | 277.37 |
| 13 | | 0.833 (ASP) | 0.900 | | | | |
| 14 | IR-cut filter | Plano | 0.300 | Glass | 1.517 | 64.2 | — |
| 15 | | Plano | 0.402 | | | | |
| 16 | Image | Plano | — | | | | |

Note: Reference wavelength is 587.6 nm (d-line).

TABLE 8

Aspheric Coefficients

| Surface # | 1 | 2 | 4 | 5 | 6 | 7 |
|---|---|---|---|---|---|---|
| k = | −7.3483E−01 | −6.2151E+01 | −2.2051E+01 | −1.6903E+01 | 7.3738E+01 | 1.0974E+00 |
| A4 = | −1.8365E−02 | −3.9384E−02 | −9.5238E−02 | −8.0119E−02 | −4.8232E−02 | −1.1840E−02 |
| A6 = | 2.3522E−02 | 1.9536E−02 | 1.2462E−02 | 5.9033E−02 | −3.6564E−02 | −4.0390E−02 |
| A8 = | 9.3874E−03 | −2.2722E−02 | −2.9097E−02 | −2.8684E−02 | 6.7237E−02 | 4.0044E−02 |
| A10 = | −2.3018E−02 | −2.7450E−02 | −2.4403E−02 | 4.1149E−02 | −1.0805E−01 | −2.3196E−02 |
| A12 = | −4.4324E−03 | 3.0328E−06 | 2.8231E−09 | −1.1580E−02 | 8.0225E−02 | −2.4414E−04 |
| A14 = | — | — | — | — | −1.9426E−02 | 3.5273E−03 |
| A16 = | — | — | — | — | — | −4.9937E−05 |

| Surface # | 8 | 9 | 10 | 11 | 12 | 13 |
|---|---|---|---|---|---|---|
| k = | −1.1355E+00 | −1.0963E+00 | −8.6776E+00 | −1.9587E+01 | −2.7087E+00 | −2.5192E+00 |
| A4 = | 1.9355E−01 | −8.1817E−03 | 3.7464E−02 | 1.0376E−01 | −1.0562E−02 | −1.5794E−02 |
| A6 = | −2.9404E−01 | 1.1864E−02 | −1.2502E−02 | −3.5390E−02 | −1.6883E−02 | −1.2625E−02 |
| A8 = | 2.9410E−01 | −1.2847E−02 | 4.2837E−04 | 4.7116E−03 | 2.9386E−03 | 4.4585E−03 |
| A10 = | −2.0334E−01 | 7.7092E−03 | 1.3011E−04 | −1.5563E−04 | 2.0213E−04 | −6.9063E−04 |
| A12 = | 7.8744E−02 | −2.0985E−03 | −1.7299E−05 | −2.1756E−05 | −9.0368E−05 | 5.8296E−05 |
| A14 = | −1.1840E−02 | 2.3793E−04 | 1.9795E−07 | 1.5309E−06 | 8.1640E−06 | −2.5878E−06 |
| A16 = | 4.2300E−05 | — | — | — | −2.6552E−07 | 4.5321E−08 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.71 | f5/f6 | 0.01 |
| Fno | 2.40 | f3/f6 | 0.01 |
| HFOV [deg.] | 43.6 | \|f/f1\| + \|f/f2\| + \|f/f6\| | 0.37 |
| V4 | 21.4 | (f5 * f6)/[f * (f5 + f6)] | 0.98 |
| CT4/CT3 | 0.44 | f/Y62 | 1.19 |
| CT6/CT5 | 0.43 | Y52/Y61 | 0.98 |
| \|(R1 + R2)/(R1 − R2)\| | 27.96 | Yc61/Yc62 | 0.82 |
| R6/R5 | −0.18 | ΣAT/TD | 0.22 |
| R8/R9 | −0.82 | SD/TD | 0.92 |
| f3/f1 | −0.02 | TL/ImgH | 1.68 |

5th Embodiment

Figure 9:
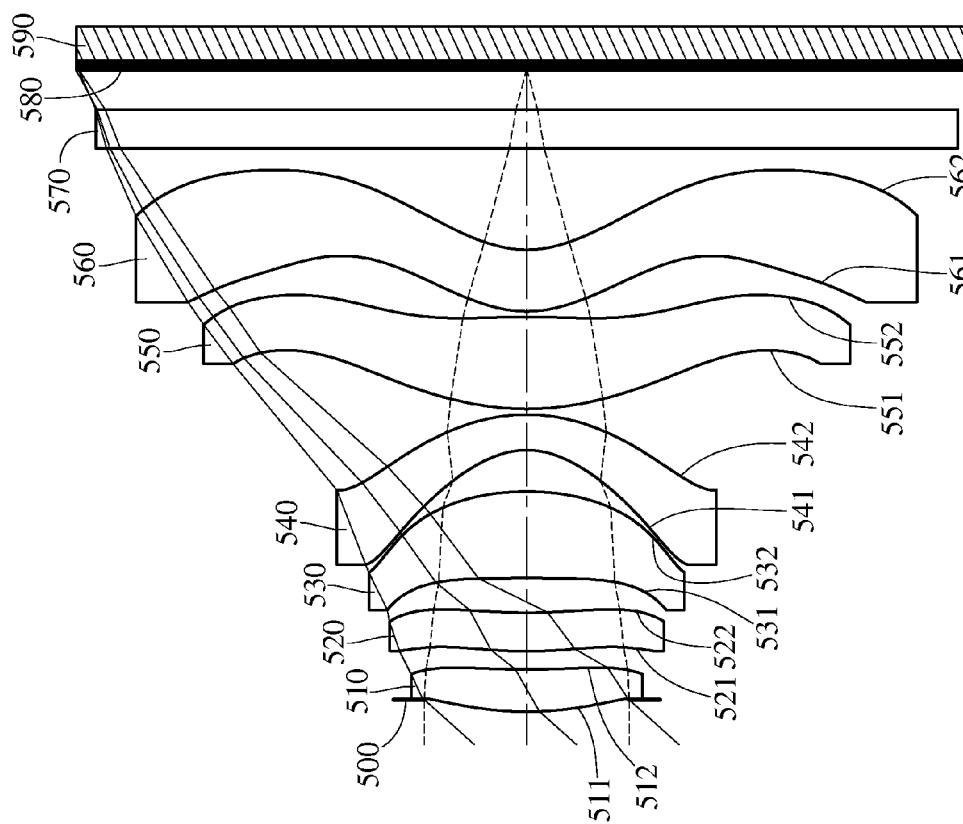
FIG. 9 is a schematic view of an image capturing unit according to the 5th embodiment of the present disclosure.
Figure 10:
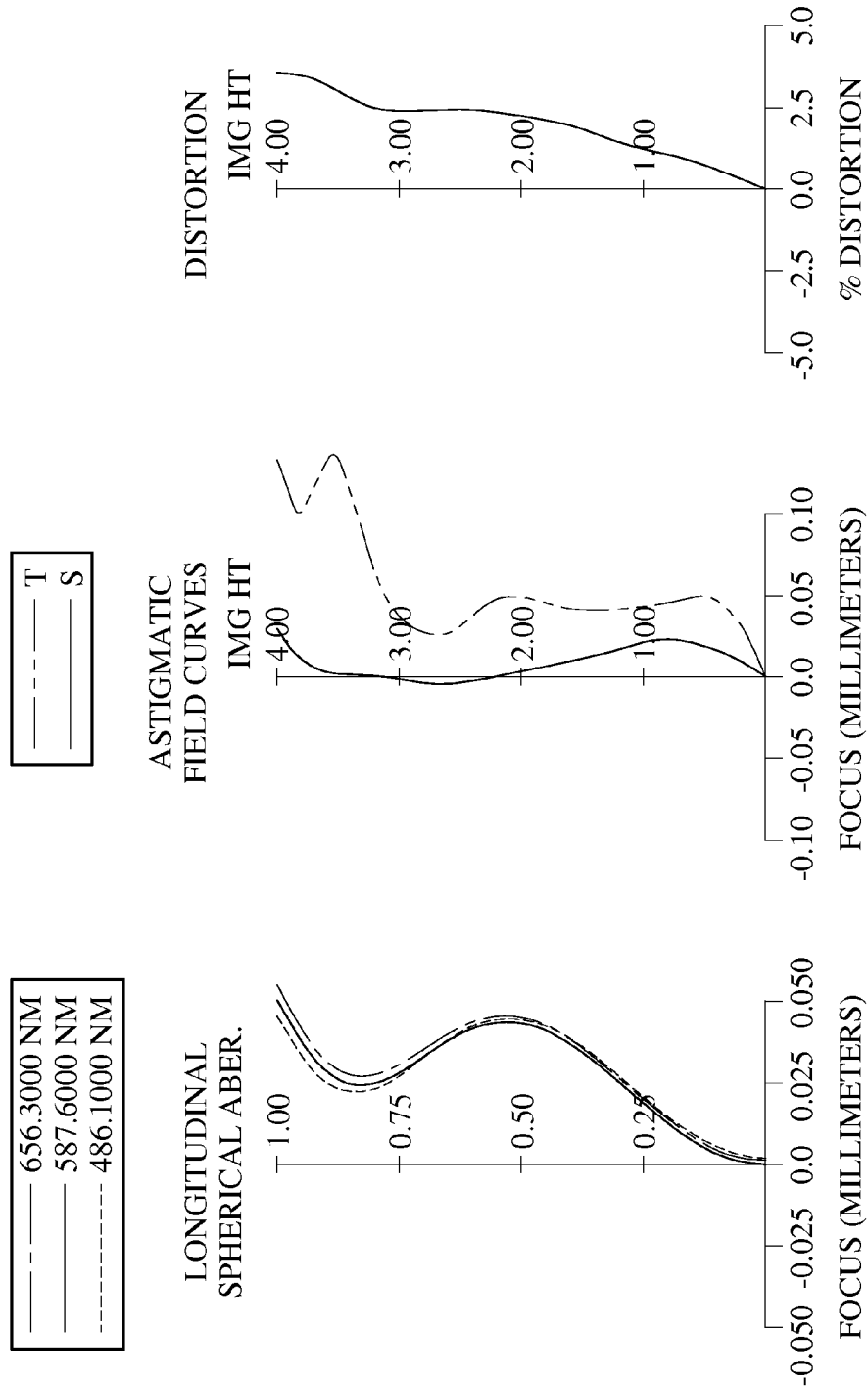
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 590. The photographing optical lens assembly includes, in order from an object side to an image side, an aperture stop 500, a first lens element 510, a second lens element 520, a third lens element 530, a fourth lens element 540, a fifth lens element 550, a sixth lens element 560, an IR-cut filter 570 and an image surface 580, wherein the photographing optical lens assembly has a total of six non-cemented lens elements (510-560) with refractive power. There is an air gap in a paraxial region between every two of the first lens element 510, the second lens element 520, the third lens element 530, the fourth lens element 540, the fifth lens element 550 and the sixth lens element 560 that are adjacent to each other. The fourth lens element 540 has the strongest refractive power among the first lens element 510, the second lens element 520, the third lens element 530, the fourth lens element 540, the fifth lens element 550 and the sixth lens element 560.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric. The image-side surface 522 of the second lens element 520 has at least one convex shape in an off-axis region thereof.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with positive refractive power has an object-side surface 551 being convex in a paraxial region thereof and an image-side surface 552 being convex in a paraxial region thereof. The fifth lens element 550 is made of plastic material and has the object-side surface 551 and the image-side surface 552 being both aspheric. The object-side surface 551 of the fifth lens element 550 has at least one inflection point. The image-side surface 552 of the fifth lens element 550 has at least one inflection point.

The sixth lens element 560 with positive refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The image-side surface 562 of the sixth lens element 560 has at least one inflection point.

The IR-cut filter 570 is made of glass and located between the sixth lens element 560 and the image surface 580, and will not affect the focal length of the photographing optical lens assembly. The image sensor 590 is disposed on or near the image surface 580 of the photographing optical lens assembly.

The detailed optical data of the 5th embodiment are shown in Table 9 and the aspheric surface data are shown in Table 10 below.

TABLE 9

5th Embodiment
f = 3.46 mm, Fno = 1.90, HFOV = 48.0 deg.

| Surface # |  | Curvature Radius | Thickness | Material | Index | Abbe # | Focal Length |
|---|---|---|---|---|---|---|---|
| 0 | Object | Plano | Infinity |  |  |  |  |
| 1 | Ape. Stop | Plano | −0.105 |  |  |  |  |
| 2 | Lens 1 | 2.839 (ASP) | 0.375 | Plastic | 1.544 | 55.9 | 9.20 |
| 3 |  | 6.249 (ASP) | 0.162 |  |  |  |  |
| 4 | Lens 2 | 3.750 (ASP) | 0.344 | Plastic | 1.544 | 55.9 | 25.23 |
| 6 |  | 4.992 (ASP) | 0.307 |  |  |  |  |
| 7 | Lens 3 | −28.465 (ASP) | 0.771 | Plastic | 1.544 | 55.9 | 4.28 |
| 8 |  | −2.173 (ASP) | 0.368 |  |  |  |  |
| 9 | Lens 4 | −0.699 (ASP) | 0.315 | Plastic | 1.639 | 23.5 | −2.23 |
| 10 |  | −1.613 (ASP) | 0.051 |  |  |  |  |
| 11 | Lens 5 | 2.405 (ASP) | 0.818 | Plastic | 1.544 | 55.9 | 3.43 |
| 12 |  | −7.305 (ASP) | 0.050 |  |  |  |  |
| 13 | Lens 6 | 1.051 (ASP) | 0.547 | Plastic | 1.544 | 55.9 | 18.08 |
| 14 |  | 0.961 (ASP) | 0.900 |  |  |  |  |
| 15 | IR-cut filter | Plano | 0.350 | Glass | 1.517 | 64.2 | — |
| 16 |  | Plano | 0.341 |  |  |  |  |
| 17 | Image | Plano | — |  |  |  |  |

Note: Reference wavelength is 587.6 nm (d-Line).

TABLE 10

Aspheric Coefficients

| Surface # | 2 | 3 | 4 | 5 | 6 | 7 |
|---|---|---|---|---|---|---|
| k = | −4.0465E−01 | 1.7948E+01 | −1.0582E+01 | −1.6508E+00 | 9.0000E+01 | 1.0738E+00 |
| A4 = | −2.5859E−02 | −9.9752E−02 | −9.2340E−02 | −7.1834E−02 | −4.5184E−02 | −1.2266E−02 |
| A6 = | −1.4913E−03 | −5.7909E−03 | 1.0289E−02 | −1.4558E−02 | −4.2924E−02 | −3.5377E−02 |
| A8 = | −1.2215E−02 | −2.1011E−02 | −4.0123E−02 | −2.8246E−02 | 6.4676E−02 | 3.4876E−02 |

TABLE 10-continued

| Aspheric Coefficients | | | | | |
|---|---|---|---|---|---|
| A10 = | −1.3703E−02 | 2.0342E−03 | 2.8096E−02 | 3.4751E−02 | −1.1793E−01 | −2.5056E−02 |
| A12 = | — | — | — | −1.2582E−02 | 8.0391E−02 | 5.1838E−04 |
| A14 = | — | — | — | — | −1.9852E−02 | 3.8679E−03 |

| Surface # | 8 | 9 | 10 | 11 | 12 | 13 |
|---|---|---|---|---|---|---|
| k = | −1.2326E+00 | −1.0640E+00 | −1.1288E+01 | −2.3950E−01 | −2.9845E+00 | −2.6516E+00 |
| A4 = | 1.9636E−01 | −1.0356E−02 | 4.2628E−02 | 1.1768E−01 | −1.4127E−02 | −1.5467E−02 |
| A6 = | −3.0035E−01 | 1.4995E−02 | −1.2793E−02 | −3.8029E−02 | −1.5749E−02 | −1.1549E−02 |
| A8 = | 2.9369E−01 | −1.1920E−02 | 4.7978E−04 | 4.7889E−03 | 2.9297E−03 | 4.3557E−03 |
| A10 = | −2.0215E−01 | 7.8473E−03 | 1.5238E−04 | −1.3633E−04 | 1.9137E−04 | −6.9378E−04 |
| A12 = | 7.9349E−02 | −2.0829E−03 | −1.5161E−05 | −2.0632E−05 | −9.1080E−05 | 5.8761E−05 |
| A14 = | −1.1806E−02 | 2.3507E−04 | 1.4835E−07 | 1.3017E−06 | 8.2368E−06 | −2.5985E−06 |
| A16 = | — | — | — | — | −2.4313E−07 | 4.7166E−08 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.46 | f5/f6 | 0.19 |
| Fno | 1.90 | f3/f6 | 0.24 |
| HFOV [deg.] | 48.0 | |f/f1| + |f/f2| + |f/f6| | 0.70 |
| V4 | 23.5 | (f5 * f6)/[f * (f5 + f6)] | 0.83 |
| CT4/CT3 | 0.41 | f/Y62 | 1.00 |
| CT6/CT5 | 0.67 | Y52/Y61 | 0.95 |
| |(R1 + R2)/(R1 − R2)| | 2.67 | Yc61/Yc62 | 0.73 |
| R6/R5 | 0.08 | ΣAT/TD | 0.23 |
| R8/R9 | −0.67 | SD/TD | 0.97 |
| f3/f1 | 0.46 | TL/ImgH | 1.42 |

6th Embodiment

Figure 11:
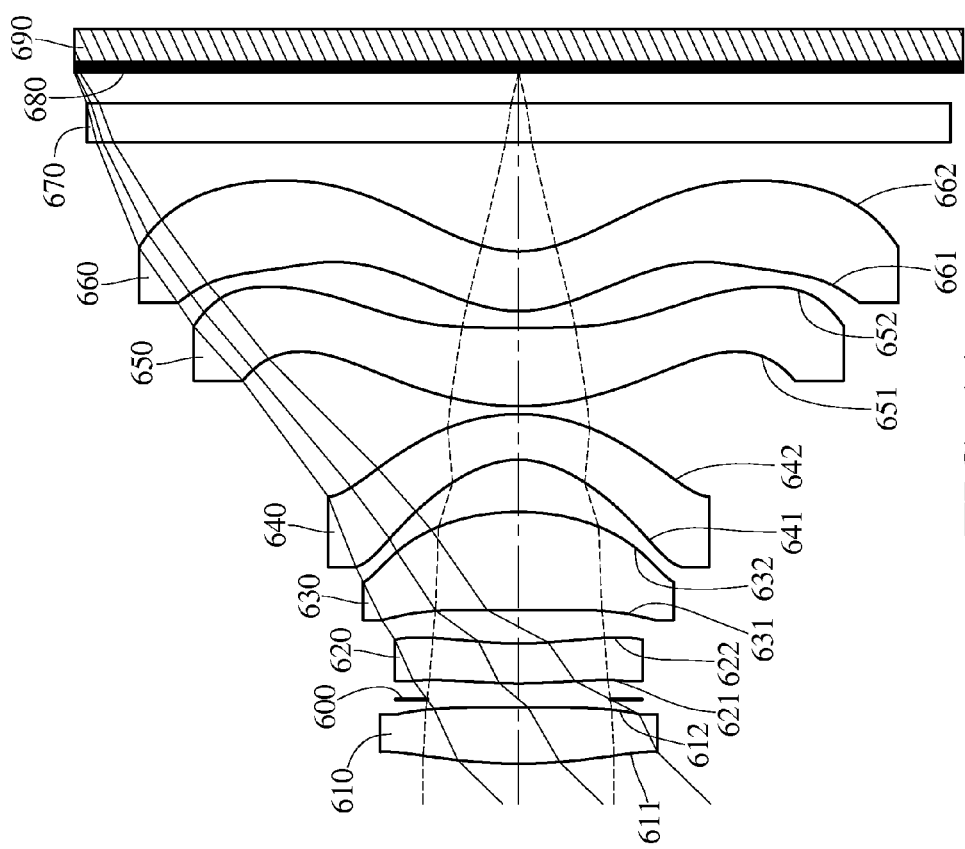
FIG. 11 is a schematic view of an image capturing unit according to the 6th embodiment of the present disclosure.
Figure 12:
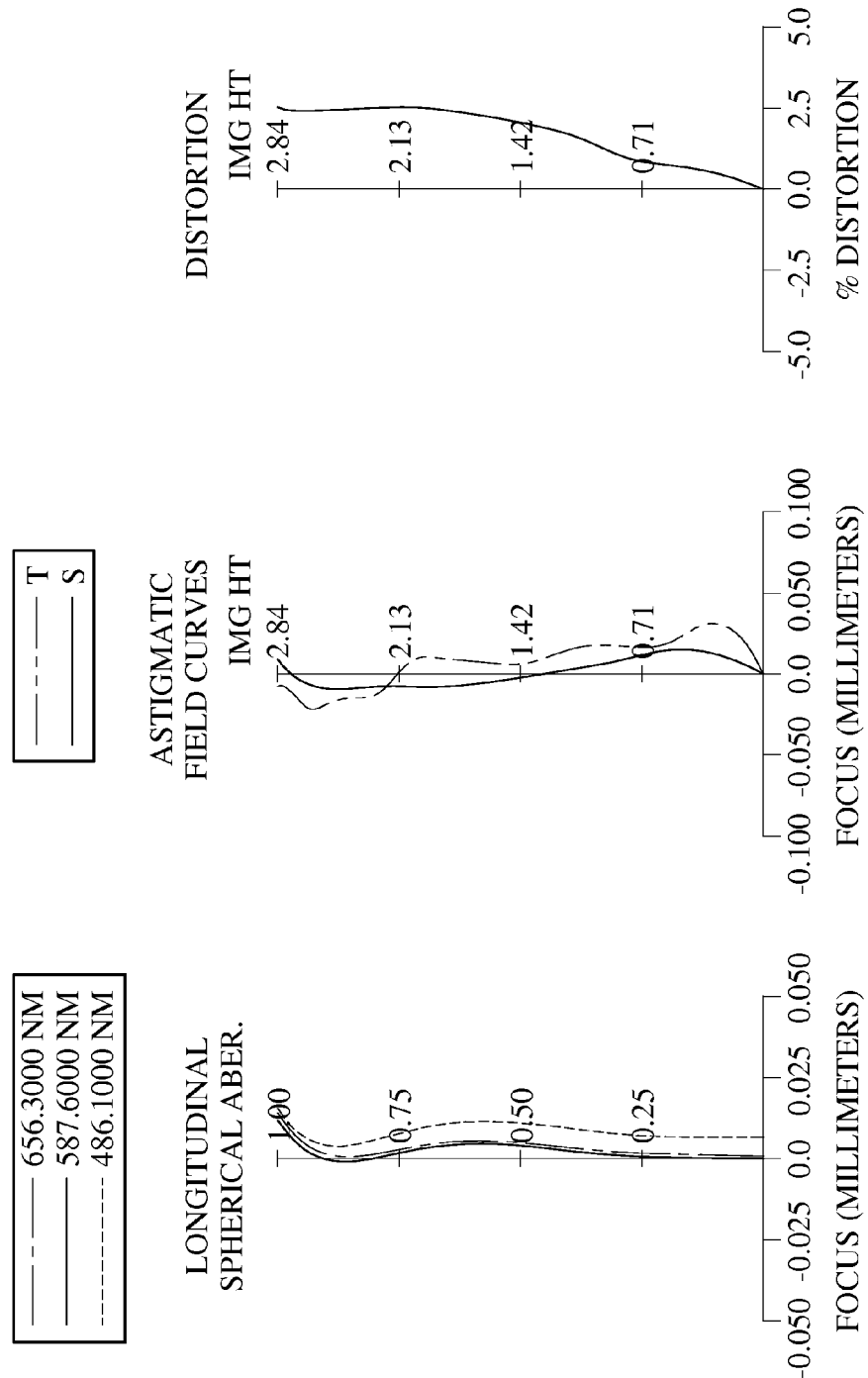
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 690. The photographing optical lens assembly includes, in order from an object side to an image side, a first lens element 610, an aperture stop 600, a second lens element 620, a third lens element 630, a fourth lens element 640, a fifth lens element 650, a sixth lens element 660, an IR-cut filter 670 and an image surface 680, wherein the photographing optical lens assembly has a total of six non-cemented lens elements (610-660) with refractive power. There is an air gap in a paraxial region between every two of the first lens element 610, the second lens element 620, the third lens element 630, the fourth lens element 640, the fifth lens element 650 and the sixth lens element 660 that are adjacent to each other. The fourth lens element 640 has the strongest refractive power among the first lens element 610, the second lens element 620, the third lens element 630, the fourth lens element 640, the fifth lens element 650 and the sixth lens element 660.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The image-side surface 622 of the second lens element 620 has at least one convex shape in an off-axis region thereof.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with positive refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The object-side surface 651 of the fifth lens element 650 has at least one inflection point. The image-side surface 652 of the fifth lens element 650 has at least one inflection point.

The sixth lens element 660 with positive refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The image-side surface 662 of the sixth lens element 660 has at least one inflection point.

The IR-cut filter 670 is made of glass and located between the sixth lens element 660 and the image surface 680, and will not affect the focal length of the photographing optical lens assembly. The image sensor 690 is disposed on or near the image surface 680 of the photographing optical lens assembly.

The detailed optical data of the 6th embodiment are shown in Table 11 and the aspheric surface data are shown in Table 12 below.

TABLE 11

6th Embodiment
f = 2.68 mm, Fno = 2.20, HFOV = 45.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.294 (ASP) | 0.362 | Plastic | 1.535 | 55.7 | 5.90 |
| 2 | | −73.965 (ASP) | 0.050 | | | | |
| 3 | Ape. Stop | Plano | 0.102 | | | | |
| 4 | Lens 2 | 3.297 (ASP) | 0.257 | Plastic | 1.639 | 23.5 | −22.17 |
| 5 | | 2.593 (ASP) | 0.212 | | | | |
| 6 | Lens 3 | 24.021 (ASP) | 0.630 | Plastic | 1.544 | 55.9 | 2.59 |
| 7 | | −1.484 (ASP) | 0.335 | | | | |
| 8 | Lens 4 | −0.555 (ASP) | 0.292 | Plastic | 1.650 | 21.4 | −1.99 |
| 9 | | −1.176 (ASP) | 0.050 | | | | |
| 10 | Lens 5 | 1.655 (ASP) | 0.503 | Plastic | 1.544 | 55.9 | 3.12 |
| 11 | | 62.182 (ASP) | 0.107 | | | | |
| 12 | Lens 6 | 0.796 (ASP) | 0.381 | Plastic | 1.535 | 55.7 | 33.88 |
| 13 | | 0.694 (ASP) | 0.700 | | | | |
| 14 | IR-cut filter | Plano | 0.250 | Glass | 1.517 | 64.2 | — |
| 15 | | Plano | 0.197 | | | | |
| 16 | Image | Plano | — | | | | |

Note: Reference wavelength is 587.6 nm (d-line).

TABLE 12

Aspheric Coefficients

| Surface # | 1 | 2 | 4 | 5 | 6 | 7 |
|---|---|---|---|---|---|---|
| k = | 5.9052E−01 | −9.0000E+01 | −1.2409E+01 | −1.4795E+01 | −9.0000E+01 | 1.0237E+00 |
| A4 = | −3.4576E−02 | −1.5018E−01 | −2.6330E−01 | −1.9025E−01 | −9.4103E−02 | 2.3114E−02 |
| A6 = | −2.9010E−02 | 1.8868E−01 | 1.9743E−01 | 8.8017E−02 | −2.1095E−01 | −1.9784E−01 |
| A8 = | 3.2161E−02 | −3.1467E−01 | −1.4566E−01 | −3.3703E−01 | 7.6987E−01 | 4.2743E−01 |
| A10 = | −8.3464E−02 | 1.4791E−01 | −1.9320E−01 | 6.6534E−01 | −2.4226E+00 | −5.2503E−01 |
| A12 = | — | — | — | −5.0733E−01 | 3.5134E+00 | 8.3439E−03 |
| A14 = | — | — | — | — | −1.7116E+00 | 3.3499E−01 |
| A16 = | — | — | — | — | — | −5.1143E−04 |

| Surface # | 8 | 9 | 10 | 11 | 12 | 13 |
|---|---|---|---|---|---|---|
| k = | −1.1720E+00 | −1.0084E+00 | −8.9211E+00 | 9.0000E+01 | −3.8206E+00 | −3.2682E+00 |
| A4 = | 5.5203E−01 | −3.4267E−02 | 1.1582E−01 | 2.8197E−01 | −2.8400E−02 | −2.0288E−02 |
| A6 = | −1.6449E+00 | 7.1264E−02 | −7.3613E−02 | −1.9848E−01 | −8.3572E−02 | −7.3210E−02 |
| A8 = | 3.2564E+00 | −1.3600E−01 | 4.8594E−03 | 5.2537E−02 | 3.2041E−02 | 4.9387E−02 |
| A10 = | −4.4693E+00 | 1.7320E−01 | 3.3333E−03 | −3.2388E−03 | 4.0962E−03 | −1.5258E−02 |
| A12 = | 3.4664E+00 | −9.1062E−02 | −7.1246E−04 | −9.3312E−04 | −4.0023E−03 | 2.5578E−03 |
| A14 = | −1.0295E+00 | 2.0744E−02 | 1.0720E−05 | 1.1959E−04 | 7.1728E−04 | −2.2612E−04 |
| A16 = | −3.5569E−05 | — | — | — | −4.1569E−05 | 8.2122E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.68 | f5/f6 | 0.09 |
| Fno | 2.20 | f3/f6 | 0.08 |
| HFOV [deg.] | 45.8 | \|f/f1\| + \|f/f2\| + \|f/f6\| | 0.66 |
| V4 | 21.4 | (f5 * f6)/[f * (f5 + f6)] | 1.06 |
| CT4/CT3 | 0.46 | f/Y62 | 1.10 |
| CT6/CT5 | 0.76 | Y52/Y61 | 0.95 |

| 6th Embodiment | | | |
|---|---|---|---|
| (R1 + R2)/(R1 − R2)\| | 0.91 | Yc61/Yc62 | 0.78 |
| R6/R5 | −0.06 | ΣAT/TD | 0.26 |
| R8/R9 | −0.71 | SD/TD | 0.87 |
| f3/f1 | 0.44 | TL/ImgH | 1.56 |

7th Embodiment

Figure 13:
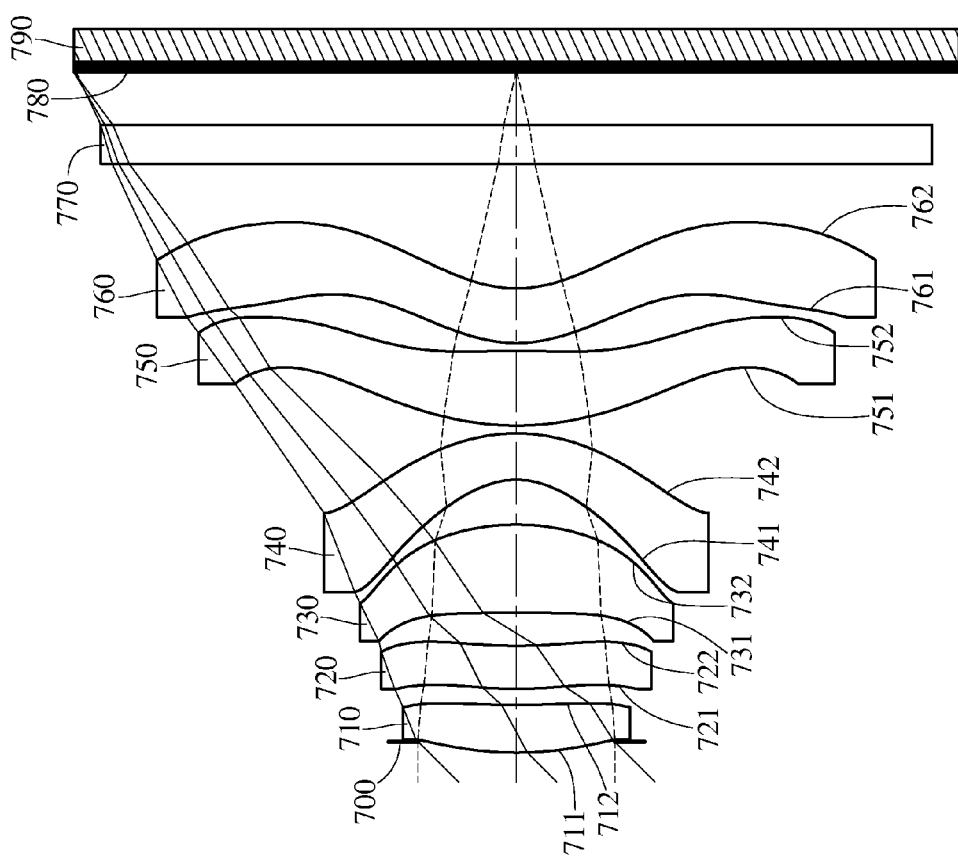
FIG. 13 is a schematic view of an image capturing unit according to the 7th embodiment of the present disclosure.
Figure 14:
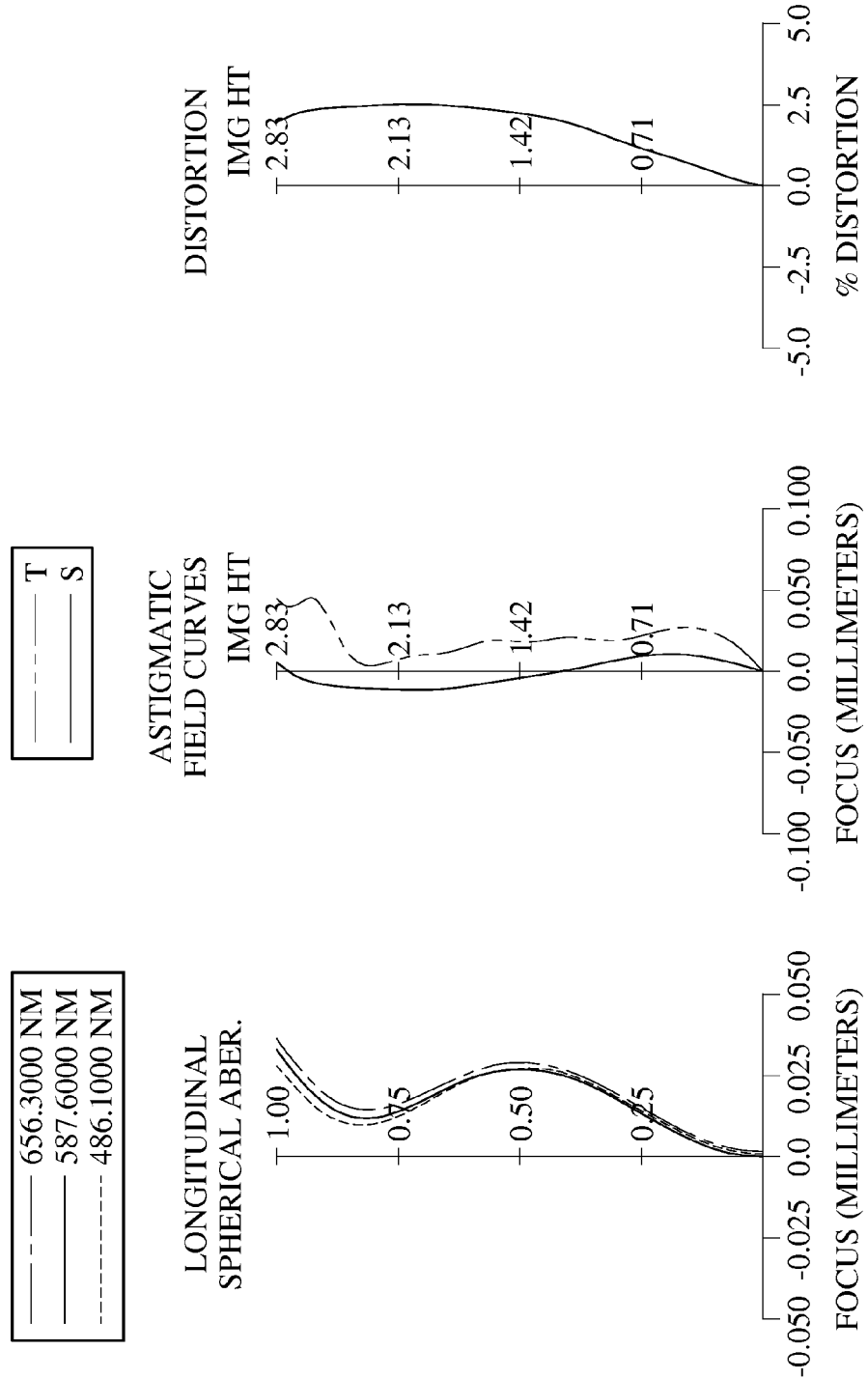
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens assembly (its reference numeral is omitted) of the present disclosure and an image sensor 790. The photographing optical lens assembly includes, in order from an object side to an image side, an aperture stop 700, a first lens element 710, a second lens element 720, a third lens element 730, a fourth lens element 740, a fifth lens element 750, a sixth lens element 760, an IR-cut filter 770 and an image surface 780, wherein the photographing optical lens assembly has a total of six non-cemented lens elements (710-760) with refractive power. There is an air gap in a paraxial region between every two of the first lens element 710, the second lens element 720, the third lens element 730, the fourth lens element 740, the fifth lens element 750 and the sixth lens element 760 that are adjacent to each other. The fourth lens element 740 has the strongest refractive power among the first lens element 710, the second lens element 720, the third lens element 730, the fourth lens element 740, the fifth lens element 750 and the sixth lens element 760.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The image-side surface 722 of the second lens element 720 has at least one convex shape in an off-axis region thereof.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with positive refractive power has an object-side surface 751 being convex in a paraxial region thereof and an image-side surface 752 being convex in a paraxial region thereof. The fifth lens element 750 is made of plastic material and has the object-side surface 751 and the image-side surface 752 being both aspheric. The object-side surface 751 of the fifth lens element 750 has at least one inflection point. The image-side surface 752 of the fifth lens element 750 has at least one inflection point.

The sixth lens element 760 with positive refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The image-side surface 762 of the sixth lens element 760 has at least one inflection point.

The IR-cut filter 770 is made of glass and located between the sixth lens element 760 and the image surface 780, and will not affect the focal length of the photographing optical lens assembly. The image sensor 790 is disposed on or near the image surface 780 of the photographing optical lens assembly.

The detailed optical data of the 7th embodiment are shown in Table 13 and the aspheric surface data are shown in Table 14 below.

TABLE 13

7th Embodiment
f = 2.77 mm, Fno = 2.20, HFOV = 45.0 deg.

| Surface # |  | Curvature Radius | Thickness | Material | Index | Abbe # | Focal Length |
|---|---|---|---|---|---|---|---|
| 0 | Object | Plano | Infinity |  |  |  |  |
| 1 | Ape. Stop | Plano | −0.070 |  |  |  |  |
| 2 | Lens 1 | 2.130 (ASP) | 0.305 | Plastic | 1.544 | 55.9 | 7.21 |
| 3 |  | 4.429 (ASP) | 0.105 |  |  |  |  |
| 4 | Lens 2 | 2.668 (ASP) | 0.275 | Plastic | 1.544 | 55.9 | 28.44 |
| 5 |  | 3.107 (ASP) | 0.211 |  |  |  |  |
| 6 | Lens 3 | −57.646 (ASP) | 0.566 | Plastic | 1.544 | 55.9 | 2.80 |
| 7 |  | −1.489 (ASP) | 0.288 |  |  |  |  |
| 8 | Lens 4 | −0.509 (ASP) | 0.297 | Plastic | 1.639 | 23.5 | −1.71 |
| 9 |  | −1.168 (ASP) | 0.050 |  |  |  |  |
| 10 | Lens 5 | 1.743 (ASP) | 0.479 | Plastic | 1.544 | 55.9 | 2.63 |
| 11 |  | −7.166 (ASP) | 0.050 |  |  |  |  |
| 12 | Lens 6 | 0.865 (ASP) | 0.350 | Plastic | 1.544 | 55.9 | 44.33 |
| 13 |  | 0.769 (ASP) | 0.800 |  |  |  |  |
| 14 | IR-cut filter | Plano | 0.250 | Glass | 1.517 | 64.2 | — |
| 15 |  | Plano | 0.336 |  |  |  |  |
| 16 | Image | Plano | — |  |  |  |  |

Note: Reference wavelength is 587.6 nm (d-line).

TABLE 14

Aspheric Coefficients

| Surface # | 2 | 3 | 4 | 5 | 6 | 7 |
|---|---|---|---|---|---|---|
| k = | 3.9287E−02 | 2.5862E+01 | −1.6294E+01 | −6.5803E+00 | 9.0000E+01 | 9.9535E−01 |
| A4 = | −6.0535E−02 | −2.9398E−01 | −2.6584E−01 | −2.0782E−01 | −1.2538E−01 | −1.7933E−03 |
| A6 = | 4.4784E−02 | 1.3370E−02 | 6.6014E−02 | −2.5255E−02 | −2.2259E−01 | −1.8520E−01 |
| A8 = | −2.2765E−01 | −1.6745E−01 | −3.8208E−01 | −3.2714E−01 | 7.0051E−01 | 3.6969E−01 |

TABLE 14-continued

| Aspheric Coefficients | | | | | |
|---|---|---|---|---|---|
| A10 = | — | — | 5.2279E−01 | 7.2621E−01 | −2.6224E+00 | −5.3779E−01 |
| A12 = | — | — | — | −5.1072E−01 | 3.5813E+00 | 2.8523E−02 |
| A14 = | — | — | — | — | −1.7273E+00 | 3.3421E−01 |

| Surface # | 8 | 9 | 10 | 11 | 12 | 13 |
|---|---|---|---|---|---|---|
| k = | −1.2474E+00 | −1.1170E+00 | −1.3111E+01 | −8.3031E−01 | −3.3965E+00 | −2.9169E+00 |
| A4 = | 5.5187E−01 | −2.7048E−02 | 1.3394E−01 | 3.3096E−01 | −2.9191E−02 | −4.4299E−02 |
| A6 = | −1.6732E+00 | 7.9046E−02 | −7.4750E−02 | −2.1194E−01 | −8.6531E−02 | −6.4406E−02 |
| A8 = | 3.2554E+00 | −1.3649E−01 | 4.9322E−03 | 5.3154E−02 | 3.2336E−02 | 4.8297E−02 |
| A10 = | −4.4593E+00 | 1.7069E−01 | 3.3851E−03 | −2.9782E−03 | 4.1867E−03 | −1.5294E−02 |
| A12 = | 3.4673E−00 | −9.1841E−02 | −6.9840E−04 | −8.9645E−04 | −3.9893E−03 | 2.5700E−03 |
| A14 = | −1.0280E+00 | 2.0284E−02 | 1.8911E−05 | 1.1009E−04 | 7.1710E−04 | −2.2600E−04 |
| A16 = | — | — | — | — | −4.2043E−05 | 8.2594E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.77 | f5/f6 | 0.06 |
| Fno | 2.20 | f3/f6 | 0.06 |
| HFOV [deg.] | 45.0 | \|f/f1\| + \|f/f2\| + \|f/f6\| | 0.54 |
| V4 | 23.5 | (f5 * f6)/[f * (f5 + f6)] | 0.89 |
| CT4/CT3 | 0.52 | f/Y62 | 1.20 |
| CT6/CT5 | 0.73 | Y52/Y61 | 0.97 |
| \|(R1 + R2)/(R1 − R2)\| | 2.85 | Yc61/Yc62 | 0.80 |
| R6/R5 | 0.03 | ΣAT/TD | 0.24 |
| R8/R9 | −0.67 | SD/TD | 0.98 |
| f3/f1 | 0.39 | TL/ImgH | 1.54 |

The foregoing image capturing unit is able to be installed in, but not limited to, an electronic device, including smart phones, tablet personal computers and wearable apparatus. According to the present disclosure, the third lens element, the fifth lens element and the sixth element all have positive refractive powers. Furthermore, the sixth lens element has an object-side surface being convex in a paraxial region thereof, an image-side surface being concave in a paraxial region thereof, and at least one inflection point. Therefore, it is favorable for reinforcing the refractive powers of the photographing optical lens assembly in the image side so as to position the principal point of the photographing optical lens assembly towards the image side, whereby it is favorable for enlarging the field of view. Moreover, both of the fifth lens element and the sixth lens element have positive refractive powers, so that it is favorable for properly distributing the refractive powers of the photographing optical lens assembly so as to avoid overloading the refractive power on a single lens element, thereby avoid excessive aberration. In addition, the sixth lens element with a convex object-side surface in a paraxial region thereof and a concave image-side surface in a paraxial region thereof having at least one inflection point is favorable for effectively reducing the total track length of the photographing optical lens assembly and correcting the astigmatism and the distortion of the off-axis.

The foregoing description, for the purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising, in order from an object side to an image side:
    a first lens element with positive refractive power having an object-side surface being convex in a paraxial region thereof;
    a second lens element having refractive power;
    a third lens element having positive refractive power;
    a fourth lens element having refractive power;
    a fifth lens element with positive refractive power having an object-side surface being convex in a paraxial region thereof and an image-side surface being convex in a paraxial region thereof, wherein both of the object-side surface and the image-side surface of the fifth lens element are aspheric; and
    a sixth lens element with positive refractive power having an object-side surface being convex in a paraxial region thereof and an image-side surface being concave in a paraxial region thereof, wherein both of the object-side surface and the image-side surface of the sixth lens element are aspheric, and the image-side surface of the sixth lens element has at least one inflection point;
    wherein the photographing optical lens assembly has a total of six lens elements with refractive power, a central thickness of the fifth lens element is CT5, a central thickness of the sixth lens element is CT6, an axial distance between the object-side surface of the first lens element and an image surface is TL, a maximum image height of the photographing optical lens assembly is ImgH, a focal length of the photographing optical lens assembly is f, a focal length of the first lens element is f1, a focal length of the fifth lens element is f5, a focal length of the sixth lens element is f6, and the following conditions are satisfied:

CT6/CT5<2.5;

TL/ImgH<3.0;

0<f1<f6; and

0<(f5*f6)/[f*(f5+f6)]<1.15.

2. The photographing optical lens assembly of claim 1, wherein the fourth lens element has negative refractive power.

3. The photographing optical lens assembly of claim 2, wherein the third lens element has an image-side surface being convex in a paraxial region thereof.

4. The photographing optical lens assembly of claim 3, wherein the fourth lens element has an image-side surface being convex in a paraxial region thereof.

5. The photographing optical lens assembly of claim 4, wherein the focal length of the photographing optical lens assembly is f, the focal length of the first lens element is f1, a focal length of the second lens element is f2, the focal length of the sixth lens element is f6, and the following condition is satisfied:

|f/f1|+|f/f2|+|f/f6|<1.0.

6. The photographing optical lens assembly of claim 4, wherein the focal length of the fifth lens element is f5, the focal length of the sixth lens element is f6, and the following condition is satisfied:

0<f5/f6<0.70.

7. The photographing optical lens assembly of claim 1, wherein the second lens element has positive refractive power.

8. The photographing optical lens assembly of claim 1, wherein the focal length of the photographing optical lens assembly is f, a maximum effective radius of the image-side surface of the sixth lens element is Y62, and the following condition is satisfied:

0.90<f/Y62<1.30.

9. The photographing optical lens assembly of claim 1, wherein the fourth lens element has the strongest refractive power among the first lens element, the second lens element, the third lens element, the fourth lens element, the fifth lens element and the sixth lens element.

10. The photographing optical lens assembly of claim 1, wherein the object-side surface of the fifth lens element has at least one inflection point, and the image-side surface of the fifth lens element has at least one inflection point.

11. The photographing optical lens assembly of claim 1, wherein a sum of axial distances between every two lens elements adjacent to each other is ΣAT, an axial distance between the object-side surface of the first lens element and the image-side surface of the sixth lens element is TD, and the following condition is satisfied:

ΣAT/TD<0.35.

12. An image capturing unit, comprising:
the photographing optical lens assembly of claim 1; and
an image sensor, wherein the image sensor is disposed on the image side of the photographing optical lens assembly.

13. An electronic device, comprising:
the image capturing unit of claim 12.

14. A photographing optical lens assembly comprising, in order from an object side to an image side:
a first lens element with refractive power having an object-side surface being convex in a paraxial region thereof;
a second lens element having refractive power;
a third lens element having positive refractive power;
a fourth lens element having refractive power;
a fifth lens element having positive refractive power, wherein both of an object-side surface and an image-side surface of the fifth lens element are aspheric; and
a sixth lens element with positive refractive power having an object-side surface being convex in a paraxial region thereof and an image-side surface being concave in a paraxial region thereof, wherein both of the object-side surface and the image-side surface of the sixth lens element are aspheric, and the image-side surface of the sixth lens element has at least one inflection point;
wherein the photographing optical lens assembly has a total of six lens elements with refractive power, a central thickness of the fifth lens element is CT5, a central thickness of the sixth lens element is CT6, an axial distance between the object-side surface of the first lens element and an image surface is TL, a maximum image height of the photographing optical lens assembly is ImgH, a curvature radius of an object-side surface of the third lens element is R5, a curvature radius of an image-side surface of the third lens element is R6, and the following conditions are satisfied:

CT6/CT5<0.90;

TL/ImgH<3.0; and

−0.5<R6/R5.

15. The photographing optical lens assembly of claim 14, wherein the first lens element has positive refractive power.

16. The photographing optical lens assembly of claim 15, wherein the second lens element has an image-side surface being concave in a paraxial region thereof, and the image-side surface of the second lens element has at least one convex shape in an off-axis region thereof.

17. The photographing optical lens assembly of claim 15, wherein an Abbe number of the fourth lens element is V4, and the following condition is satisfied:

V4<28.

18. The photographing optical lens assembly of claim 14, wherein a focal length of the photographing optical lens assembly is f, a focal length of the fifth lens element is f5, a focal length of the sixth lens element is f6, and the following condition is satisfied:

0<(f5*f6)/[f*(f5+f6)]<1.15.

19. The photographing optical lens assembly of claim 14, further comprising a stop, wherein the stop is located between an imaged object and the second lens element, there is an air gap in a paraxial region between every two of the first lens element, the second lens element, the third lens element, the fourth lens element, the fifth lens element and the sixth lens element that are adjacent to each other, the axial distance between the object-side surface of the first lens element and the image surface is TL, the maximum image height of the photographing optical lens assembly is ImgH, and the following condition is satisfied:

TL/ImgH<2.0.

20. A photographing optical lens assembly comprising, in order from an object side to an image side:
- a first lens element with refractive power having an object-side surface being convex in a paraxial region thereof;
- a second lens element having refractive power;
- a third lens element having positive refractive power;
- a fourth lens element having refractive power;
- a fifth lens element having positive refractive power, wherein both of an object-side surface and an image-side surface of the fifth lens element are aspheric; and
- a sixth lens element with positive refractive power having an object-side surface being convex in a paraxial region thereof and an image-side surface being concave in a paraxial region thereof, wherein both of the object-side surface and the image-side surface of the sixth lens element are aspheric, and the image-side surface of the sixth lens element has at least one inflection point;

wherein the photographing optical lens assembly has a total of six lens elements with refractive power, a central thickness of the fifth lens element is CT5, a central thickness of the sixth lens element is CT6, an axial distance between the object-side surface of the first lens element and an image surface is TL, a maximum image height of the photographing optical lens assembly is ImgH, a curvature radius of an object-side surface of the third lens element is R5, a curvature radius of an image-side surface of the third lens element is R6, a focal length of the photographing optical lens assembly is f, a focal length of the fifth lens element is f5, a focal length of the sixth lens element is f6, and the following conditions are satisfied:

$CT6/CT5 < 1.5;$ $TL/ImgH < 3.0;$ $-0.5 < R6/R5;$ and $0 < (f5*f6)/[f*(f5+f6)] < 1.15.$ 21. The photographing optical lens assembly of claim 20, wherein the first lens element has positive refractive power.

22. The photographing optical lens assembly of claim 21, wherein the second lens element has an object-side surface being convex in a paraxial region thereof.

23. The photographing optical lens assembly of claim 20, wherein a curvature radius of the object-side surface of the first lens element is R1, a curvature radius of an image-side surface of the first lens element is R2, and the following condition is satisfied:

$|(R1+R2)/(R1-R2)| < 4.0.$

24. The photographing optical lens assembly of claim 20, wherein a central thickness of the third lens element is CT3, a central thickness of the fourth lens element is CT4, and the following condition is satisfied:

$CT4/CT3 < 0.70.$

25. The photographing optical lens assembly of claim 20, further comprising a stop, wherein an axial distance between the stop and the image-side surface of the sixth lens element is SD, an axial distance between the object-side surface of the first lens element and the image-side surface of the sixth lens element is TD, and the following condition is satisfied:

$0.8 < SD/TD < 1.2.$

26. The photographing optical lens assembly of claim 20, wherein a curvature radius of an image-side surface of the fourth lens element is R8, a curvature radius of the object-side surface of the fifth lens element is R9, and the following condition is satisfied:

$R8/R9 < 0.$

27. The photographing optical lens assembly of claim 26, wherein the object-side surface of the fifth lens element is convex in a paraxial region thereof, a vertical distance between a non-axial critical point on the object-side surface of the sixth lens element and an optical axis is Yc61, a vertical distance between a non-axial critical point on the image-side surface of the sixth lens element and the optical axis is Yc62, and the following condition is satisfied:

$0.5 < Yc61/Yc62 < 1.0.$

28. The photographing optical lens assembly of claim 20, wherein a focal length of the first lens element is f1, a focal length of the third lens element is f3, and the following condition is satisfied:

$-0.10 < f3/f1 < 0.80.$

29. The photographing optical lens assembly of claim 20, wherein the fourth lens element has an object-side surface being concave in a paraxial region thereof, a focal length of the third lens element is f3, the focal length of the sixth lens element is f6, and the following condition is satisfied:

$0 < f3/f6 < 0.5.$

30. The photographing optical lens assembly of claim 20, wherein a maximum effective radius of the image-side surface of the fifth lens element is Y52, a maximum effective radius of the object-side surface of the sixth lens element is Y61, and the following condition is satisfied:

$0.88 < Y52/Y61 < 1.05.$

* * * * *